United States Patent
Ogura et al.

(10) Patent No.: US 10,516,535 B2
(45) Date of Patent: Dec. 24, 2019

(54) MANAGEMENT APPARATUS, MEASUREMENT APPARATUS, SERVICE PROVIDING APPARATUS, COMPUTER PROGRAM PRODUCT, TRANSFER SYSTEM, AND TRANSFER METHOD

(71) Applicant: Kabushiki Kaisha Toshiba, Minato-ku (JP)

(72) Inventors: Naoki Ogura, Yokohama (JP); Toru Kambayashi, Chigasaki (JP); Yoshikazu Hanatani, Komae (JP); Takahiro Yamada, Yokohama (JP); Takeshi Saito, Meguro (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 291 days.

(21) Appl. No.: 15/428,694

(22) Filed: Feb. 9, 2017

(65) Prior Publication Data
US 2017/0155512 A1 Jun. 1, 2017

Related U.S. Application Data

(63) Continuation of application No. PCT/JP2014/074872, filed on Sep. 19, 2014.

(51) Int. Cl.
*H04L 9/08* (2006.01)
*H04L 29/06* (2006.01)
*H04L 9/32* (2006.01)

(52) U.S. Cl.
CPC ............ *H04L 9/32* (2013.01); *H04L 9/0891* (2013.01); *H04L 9/0894* (2013.01); *H04L 63/0272* (2013.01); *H04L 63/0428* (2013.01)

(58) Field of Classification Search
CPC ....... H04L 9/32; H04L 9/3273; H04L 9/0869; H04L 9/0866; H04L 63/068;
(Continued)

(56) References Cited

U.S. PATENT DOCUMENTS

| 2005/0259824 A1* | 11/2005 | Isozaki | ................. | H04L 63/061 |
| | | | | 380/255 |
| 2010/0254533 A1* | 10/2010 | McCullough | ............. | H04L 9/12 |
| | | | | 380/44 |

(Continued)

FOREIGN PATENT DOCUMENTS

| JP | 2007-215103 | 8/2007 |
| JP | 2012-213009 | 11/2012 |
| WO | WO 2010/096923 A1 | 9/2010 |

OTHER PUBLICATIONS

International Search Report dated Nov. 18, 2014 in PCT/JP2014/074872, filed on Sep. 19, 2014 (with English Translation).

(Continued)

*Primary Examiner* — Daniel B Potratz
*Assistant Examiner* — Vu V Tran
(74) *Attorney, Agent, or Firm* — Oblon, McClelland, Maier & Neustadt, L.L.P.

(57) ABSTRACT

A management apparatus according to an embodiment is connected to a measurement apparatus deployed for each user via a first network. The management apparatus is connected to a service providing apparatus via a second network. The management apparatus includes a first communication device, a second communication device and one or more first processors. The first processors generate seed information using a service providing apparatus identifier. The first processors generate a user key using a measurement apparatus individual key, and the seed information. The first communication device transmits the generated seed information to the measurement apparatus via the first network. The second communication device transmits the generated user key to the service providing apparatus via the second network.

3 Claims, 19 Drawing Sheets

(58) Field of Classification Search
CPC ..... H04L 63/061; H04L 63/18; H04L 63/126; H04L 63/0272; H04L 63/0428; H04L 9/3242; H04L 9/0894; H04L 9/0891
See application file for complete search history.

(56) References Cited

U.S. PATENT DOCUMENTS

| | | | |
|---|---|---|---|
| 2012/0250867 A1* | 10/2012 | Kambayashi | H04L 9/0844 380/282 |
| 2014/0375474 A1* | 12/2014 | Dietrich | G06F 21/44 340/870.02 |
| 2015/0215119 A1 | 7/2015 | Kambayashi et al. | |
| 2016/0043866 A1* | 2/2016 | Nixon | G05B 19/41855 713/168 |

OTHER PUBLICATIONS

Written Opinion dated Nov. 18, 2014 in PCT/JP2014/074872, filed on Sep. 19, 2014.
Jinyue Xia et al. "Secure Key Distribution for the Smart Grid," IEEE Transactions on SMATR Grid,vol. 3, No. 3, Sep. 2012, pp. 7.
Hasen Nicanfar et al. "Efficient Authentication and Key Management Mechanisms for Smart Grid Communications," IEEE Systems Journal, vol. 8, No. 2, Jun. 2014, pp. 12.

* cited by examiner

MANAGEMENT APPARATUS, MEASUREMENT APPARATUS, SERVICE PROVIDING APPARATUS, COMPUTER PROGRAM PRODUCT, TRANSFER SYSTEM, AND TRANSFER METHOD

CROSS-REFERENCE TO RELATED APPLICATIONS

This application is a continuation of PCT international application Ser. No. PCT/JP2014/074872 filed on Sep. 19, 2014 which designates the United States; the entire contents of which are incorporated herein by reference.

FIELD

The present invention relates to a management apparatus, a measurement apparatus, a service providing apparatus, a computer program product, a transfer system, and a transfer method.

BACKGROUND

Measurement information measured by a measurement apparatus is transmitted to an information processing apparatus (service providing apparatus) providing an information processing service related to the measurement information to a user. The service providing apparatus then executes the information processing based on the received measurement information.

DETAILED DESCRIPTION

Figure 1:
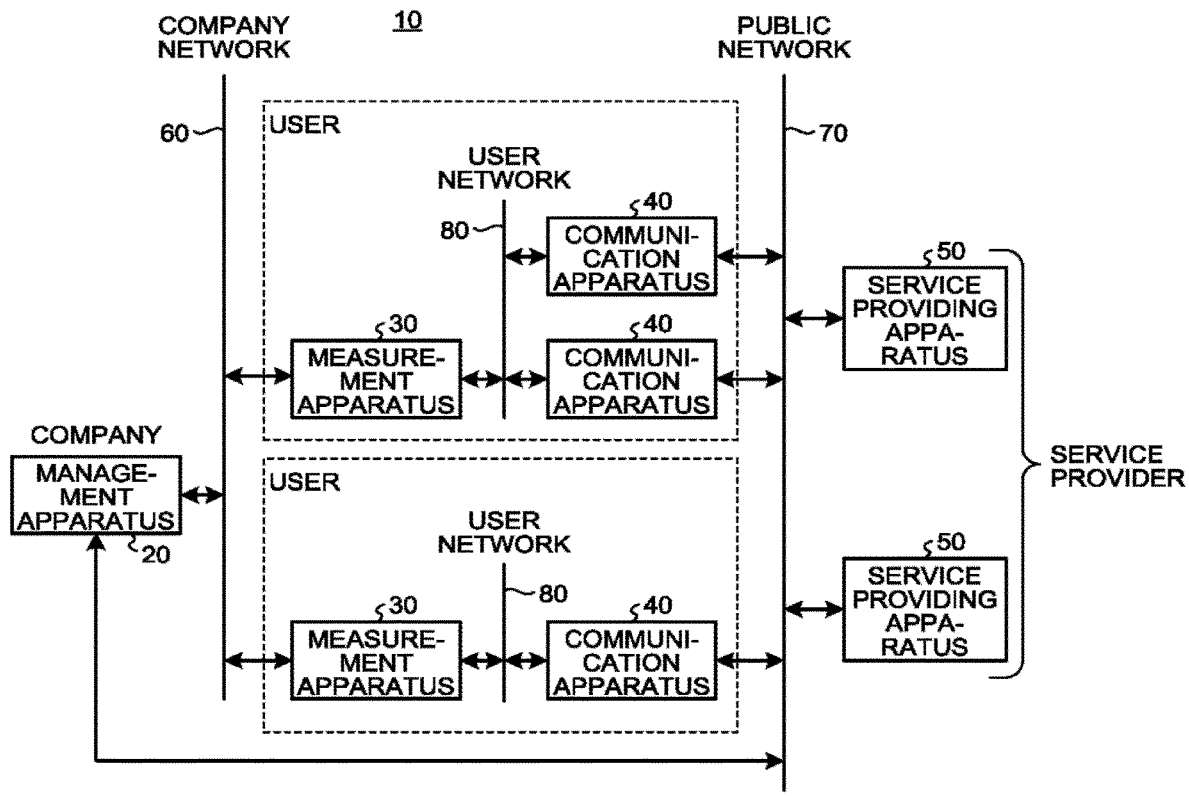
FIG. 1 is a schematic diagram illustrating a transfer system according to a first embodiment of the present invention.

A management apparatus according to an embodiment is connected to a measurement apparatus deployed for each user via a first network. The management apparatus is connected to a service providing apparatus via a second network. The management apparatus includes first storage, a first communication device, a second communication device, and one or more first processors. The first storage stores therein a service providing apparatus identifier shared with the service providing apparatus. The first storage stores therein a measurement apparatus individual key shared with the measurement apparatus. The first processors coupled to the first storage, the first communication device and the second communication device. The first processors generate seed information using the service providing apparatus identifier. The first processors generate a user key using the measurement apparatus individual key and the seed information. The first communication device transmits the generated seed information to the measurement apparatus via the first network. The second communication device transmits the generated user key to the service providing apparatus via the second network.

A transfer system according to some embodiments of the present invention will now be explained in detail with reference to some drawings. The transfer system according to the embodiments can transmit measurement information measured by a measurement apparatus to a service providing apparatus securely and with a simple process. In explaining the embodiments and the modification below, the elements having substantially the same functions as those according to an embodiment or the like previously explained are given the same reference signs in the drawings, and redundant explanations thereof will be omitted.

First Embodiment

FIG. 1 is a schematic diagram illustrating a transfer system 10 according to a first embodiment of the present invention. The transfer system 10 includes a management apparatus 20, one or more measurement apparatuses 30, one or more communication apparatuses 40, and one or more service providing apparatuses 50.

The management apparatus 20 and the measurement apparatuses 30 are connected via a company network 60 (a business entity network). The service providing apparatuses 50 and the communication apparatuses 40 are connected via a public network 70. Each of the measurement apparatuses 30 is connected to the corresponding communication apparatus 40 via a user network 60. The service providing apparatuses 50 and the management apparatus 20 are connected via the public network 70. The service providing apparatuses 50 and the management apparatus 20 may be connected via a network other than the public network 70 (such as a dedicated network). The service providing apparatus 50 and the management apparatus 20 may be integrated as one apparatus.

Illustrated in FIG. 1 is an example in which the transfer system 10 includes two measurement apparatuses 30, three communication apparatuses 40, and two service providing apparatuses 50, but the numbers of such apparatuses included in the transfer system 10 is not limited to these numbers.

The management apparatus 20 is an information processing apparatus managed by the business entity. The business entity provides a service, such as supplying electricity, gas, heat, water, or discharging wastewater, to users. The users are those receiving the service provided by the business entity, such as supply of electricity, and examples of the users include homes, companies, buildings, regions, stores, and factories. A user is identified by a piece of user information, such as the name of a representative, a telephone number, a customer number, or the address at which the service is provided.

The measurement apparatuses 30 is an information processing apparatus deployed for each user. Each of the measurement apparatuses 30 acquires measurement information indicating the physical quantity of a target of the service provided by the business entity to the corresponding user. In the embodiment, the measurement apparatus 30 measures the amount of electricity usage per unit time of each device being used by the user. The measurement apparatus 30 may also be an instrument for measuring the amount of gas usage, the amount of heat usage, the amount of water usage, or the amount of wastewater, for example. The measurement apparatus 30 is deployed at a location where the user can receive the service provided by the business entity (such as home, a company, a building, a region, a store, or a factory), and has a one-to-one corresponding relation with the user.

The company network 60 is a network managed by the business entity. The company network 60 may be a communication network connecting the measurement apparatuses 30 by wireless multi-hopping, or a mobile phone communication network, for example. The company network 60 may also be a communication network deployed as a power line communication (PLC) network using concentrators and a wide area communication network. Because the company network 60 is managed by the business entity, the management apparatus 20 and each of the measurement apparatuses 30 can share the information required for establishing a communication, and can securely perform mutual authentication, encrypted communication, integrity check, and the like.

The communication apparatus 40 is deployed for each user. The communication apparatus 40 acquires the measurement information measured by the measurement apparatus 30 via the user network 80. An example of the communication apparatus 40 is a home gateway connected to the measurement apparatus 30 via the user network 80. The communication apparatus 40 may also be a broadband router or a mobile terminal such as a smartphone, as other examples. The communication apparatus 40 may be an apparatus housed in a concentrator that is the terminator of the measurement apparatus 30, or to the measurement apparatus 30. When the communication apparatus 40 is an apparatus housed in the concentrator or measurement apparatus 30, the communication apparatus 40 is connected to the measurement apparatus 30 without the user network 80.

The communication apparatus 40 is connected to the devices being used by the user (such as air conditioners and other electric devices) via the user network 80, and acquires the amount of usage of the target of the service provided by the business entity, used by each of such devices (such as the amount of electricity usage) as measurement information. The communication apparatus 40 then may calculate a breakdown of information represented in the measurement information based on such pieces of information, and present the breakdown to the user.

The user network 80 is a network for connecting the measurement apparatus 30 and the communication apparatuses 40 internally within the user, and is a network deployed at home, for example. Examples of the user network 60 include a local area network (LAN), an intranet and an Ethernet (registered trademark). The user network 80 is managed by the user, and is not basically directly managed by the business entity, the service provider, or the like.

The service providing apparatus 50 is an information processing apparatus managed by the service provider. Using the service providing apparatus 50, the service provider provides an information processing service related to the service provided by the business entity. For example, the service providing apparatus 50 performs billing for the target of the service provided by the business entity (for example, billing for the amount of electricity usage) via information processing. The service providing apparatus 50 executes information processing such as issuing a request for suppressing the amount of electricity usage to the user, and making the payment for a reward for contributing to the suppression request (demand response process).

Each of the service providing apparatuses 50 provides the same information processing service to a group of a plurality of users (such as a group of users classified by the region, or a group of users classified by the contract type). The transfer system 10 may be provided with different service providing apparatuses 50 for a plurality of respective different types of information processing services.

The public network 70 is a network that is available to unspecified users. Examples of the public network 70 include the Internet or a virtual private network (VPN). The public network 70 is capable of transferring a large amount of data at a high speed at a lower cost, compared with the company network 60. However, mutual authentication, integrity check, and the like are necessary for two parties to communicate with each other secretly, because the public network 70 is available to unspecified users. The service providing apparatus 50 is capable of performing such mutual authentication, integrity check, and the like with the management apparatus 20 via the public network 70.

Figure 2:
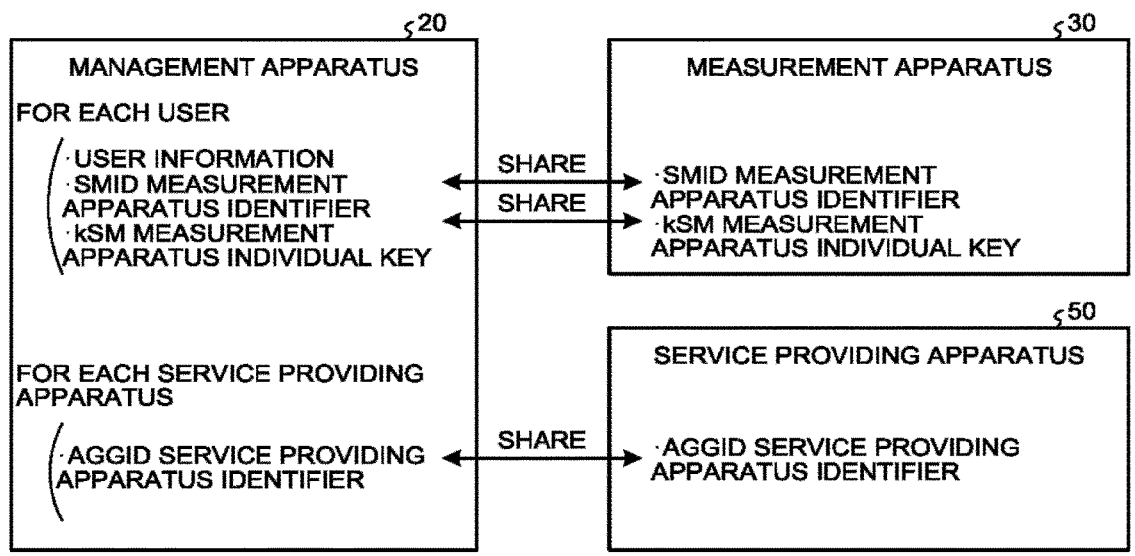
FIG. 2 is a schematic diagram illustrating the information stored in each unit included in the transfer system.

FIG. 2 is a schematic diagram illustrating information stored in each of such elements included in the transfer system 10 according to the first embodiment.

Each measurement apparatus 30 is assigned with a measurement apparatus identifier SMID that is a piece of unique identification information. Each of the measurement apparatuses 30 stores therein the measurement apparatus identifier SMID assigned thereto. The way in which the measurement apparatus identifier SMID is assigned are dependent on the policies defined by the business entity. Different measurement apparatus identifiers SMID are set to different measurement apparatuses 30.

Each of the measurement apparatuses 33 stores therein a measurement apparatus individual key kSM that is a secret key for performing encrypted communication, mutual authentication, and the like with the management apparatus 20. Each of the measurement apparatuses 30 stores the measurement apparatus individual key kSM in a tamper-resistant storage device applied with a circuit obfuscation and protections against physical analysis, to make it difficult for any malicious third party to analyze the measurement apparatus 30 and to acquire measurement apparatus individual key kSM. The measurement apparatus individual key kSM is updated by the management apparatus 20, for example. The frequency at which the measurement apparatus individual key kSM is updated is dependent on the policy defined by the business entity, and may be once in a half a year, or once in a few years, for example.

Each of the service providing apparatuses 50 is assigned with a service providing apparatus identifier AGGID that is a piece of unique identification information. Each of the service providing apparatuses 50 stores therein the service providing apparatus identifier AGGID assigned thereto.

The management apparatus 20 stores therein pieces of user information for a plurality of respective users. The management apparatus 20 also stores therein the measurement apparatus identifiers SMID and the measurement apparatus individual keys kSM of the measurement apparatus 30 deployed at each user. The management apparatus 20 manages the measurement apparatus identifiers SMID and the measurement apparatus individual keys kSM securely, in a concealed manner so as to prevent any malicious third party from acquiring the identifiers and the keys. The management apparatus 20 also stores therein the service providing apparatus identifiers AGGID assigned to the respective service providing apparatuses 50.

In other words, the management apparatus 20 and each of the measurement apparatuses 30 share and both store therein the measurement apparatus identifier SMID and the measurement apparatus individual key kSM. The management apparatus 20 and each of the service providing apparatuses 50 also share and both store therein the service providing apparatus identifier AGGID.

Figure 3:
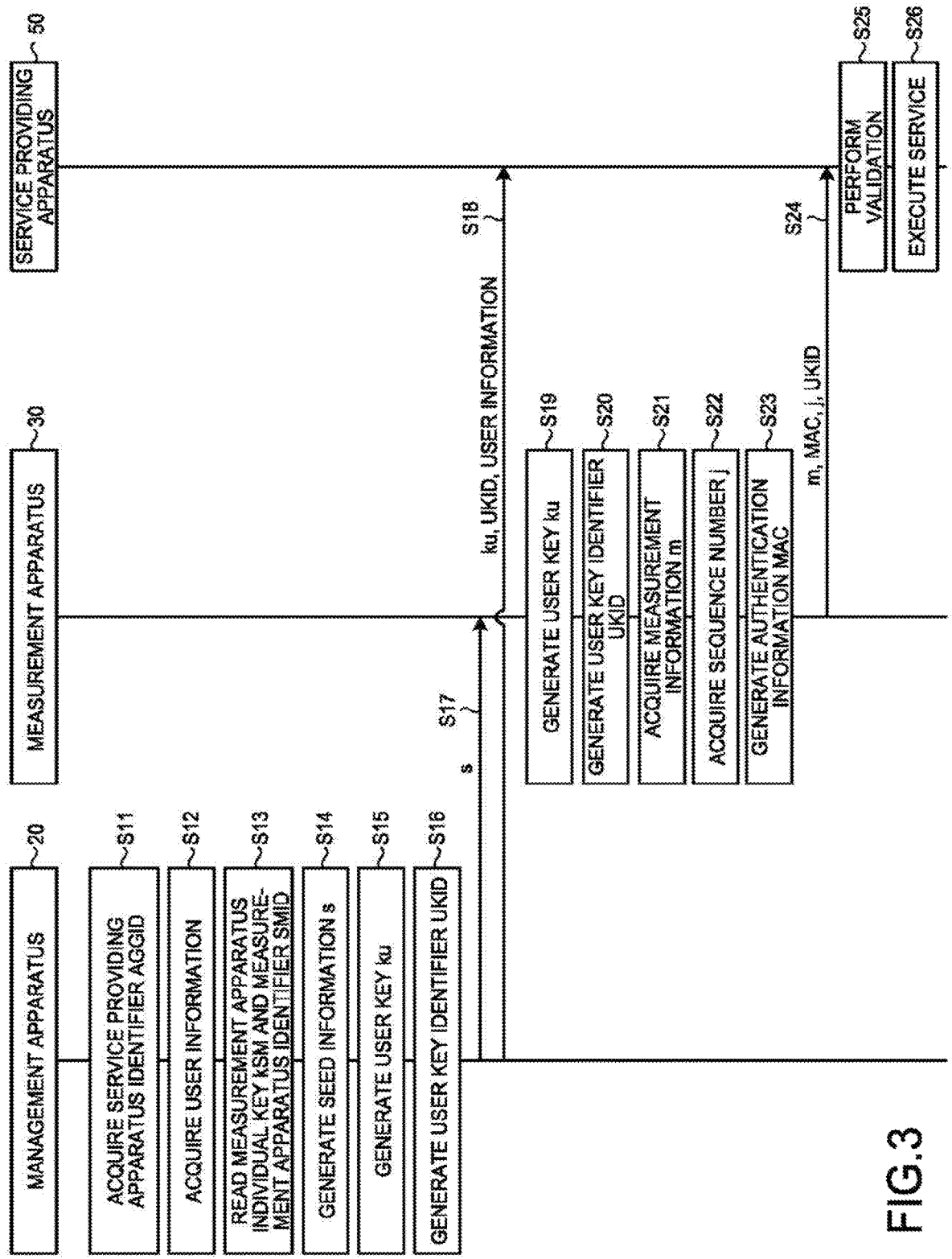
FIG. 3 is a schematic diagram illustrating the sequence of a process performed in the transfer system according to the first embodiment.

FIG. 3 is a schematic diagram illustrating the sequence of information processing in the transfer system 10 according to the first embodiment.

To begin with, the management apparatus 20 acquires the service providing apparatus identifier AGGID of the service providing apparatus 50 providing the information processing service (first identification information) (Step S11). The management apparatus 20 then acquires the user information of the user to whom the service providing apparatus 50 provides the information processing service (Step S12). The management apparatus 20 then reads the measurement apparatus individual key kSM (first key) and the measurement apparatus identifier SMID (second identification information) stored in a manner associated with the acquired user information (Step S13).

The management apparatus 20 generates seed information s (first generated value) from the acquired service providing apparatus identifier AGGID and a random number r (Step S14). A specific example of how the seed information s is generated will be described later in detail.

The management apparatus 20 then generates a user key ku (second generated value) from the measurement apparatus individual key kSM and the seed information s (Step S15). A specific example of how the user key ku is generated will be described later in detail.

The management apparatus 20 then generates a user key identifier UKID (third generated value) from the measurement apparatus identifier SMID and the seed information s (Step S16). A specific example of how the user key identifier UKID is generated will be described later in detail.

The management apparatus 20 then transmits the seed information s to the corresponding measurement apparatus 30 via the company network 60 (Step S17). When this process is performed for a plurality of measurement apparatuses 30 in parallel, the management apparatus 20 may transmit the same seed information s to the measurement apparatuses 30 all at once via multicasting, for example.

The management apparatus 20 then transmits the user key ku, the user key identifier UKID, and the user information to the corresponding service providing apparatus 50 via the public network 70 (Step S18). In this case, the management apparatus 20 transmits the user key ku, the user key identifier UKID, and the user information to the service providing apparatus 50 in a manner concealed from any third parties, using an encrypted communication, for example.

The measurement apparatus 30 then generates a user key ku from the measurement apparatus individual key kSM stored therein, and the seed information s received from the management apparatus 20 (Step S19). The user key ku is generated in the same manner as Step S15 in the management apparatus 20.

The measurement apparatus 30 then generates a user key identifier UKID from the measurement apparatus identifier SKID stored therein, and the seed information s received from the management apparatus 20 (Step S20). The way in which the user key identifier UKID is generated is the same as Step S16 in the management apparatus 20.

The measurement apparatus 30 then acquires measurement information m (Step S21). The measurement apparatus 30 acquires the amount of electricity usage per unit time, for each of the devices being used by the user, as an example, as the measurement information m.

The measurement apparatus 30 then acquires a sequence number j (Step S22). The sequence number j is a value incremented or decremented from a predetermined initial value by a predetermined count (such as one) every time authentication information MAC is generated.

The measurement apparatus 30 then generates the authentication information MAC authenticating the legitimacy of the measurement information m, based on the measurement information m, the user key ku, and the sequence number j (Step S23). The authentication information MAC is information for authenticating that the measurement information m has been legitimately generated by the measurement apparatus 30, and that the measurement information m has not been manipulated. A specific example of how the authentication information MAC is generated will be described later in detail.

The measurement apparatus 30 then transmits the measurement information m, the authentication information MAC, the sequence number j, and the user key identifier UKID to the corresponding service providing apparatus 50 via the communication apparatus 40 and the public network 70 (Step S24).

The service providing apparatus 50 then validates the legitimacy of the measurement information m based on the user key ku received from the management apparatus 20, and the measurement information m, the sequence number j, and the authentication information MAC received from tie measurement apparatus 30 (Step S25). More specifically, the service providing apparatus 50 generates validating authentication information MAC' based on the user key ku received from the management apparatus 20, and the measurement information m and the sequence number j received from the measurement apparatus 30. If the validating authentication information MAC' matches the authentication information MAC received from the measurement apparatus 30, the service providing apparatus 50 determines that the measurement information m received from the measurement apparatus 30 is legitimate.

The service providing apparatus 50 then performs the information processing service using the measurement information m having been determined to be legitimate (Step S26). For example, the service providing apparatus 50 performs the information processing for billing for the amount of electricity usage, or for the demand response, based on the amount of electricity usage per unit time.

In such a transfer system 10, the measurement apparatus 30 generates the authentication information MAC for measurement information m using the user key ku that is concealed from any third parties. In this manner, the measurement apparatus 30 can prevent the measurement information m from being manipulated. Furthermore, because the service providing apparatus 50 acquires the user key ku from the management apparatus 20, the secret key can be shared with the measurement apparatus 30, and the legitimacy of the measurement information m can be validated without performing the mutual authentication and the like with the measurement apparatus 30. In this manner, with the transfer system 10, any manipulation of the measurement information m can be prevented easily.

Furthermore, the measurement apparatus 30 transmits the measurement information m to the service providing apparatus 50 via the public network 70. In this manner, with the transfer system 10, the limitations imposed by a communication channel can be reduced, and a large amount of the measurement information m can be transferred from the measurement apparatus 30 to the service providing apparatus 50.

Furthermore, the management apparatus 20 also transmits the seed information s generated for each of the service providing apparatuses 50 to a plurality of measurement apparatuses 30. Because the management apparatus 20 merely needs to transmit one piece of data that is not dependent on the measurement apparatuses 30 to the measurement apparatuses 30, the communication load on the company network 60 can be reduced.

In the manner described above, with the transfer system 10 according to the embodiment, the measurement information m acquired by the measurement apparatus 30 can be transmitted to the service providing apparatus 50 securely and easily.

Figure 4:
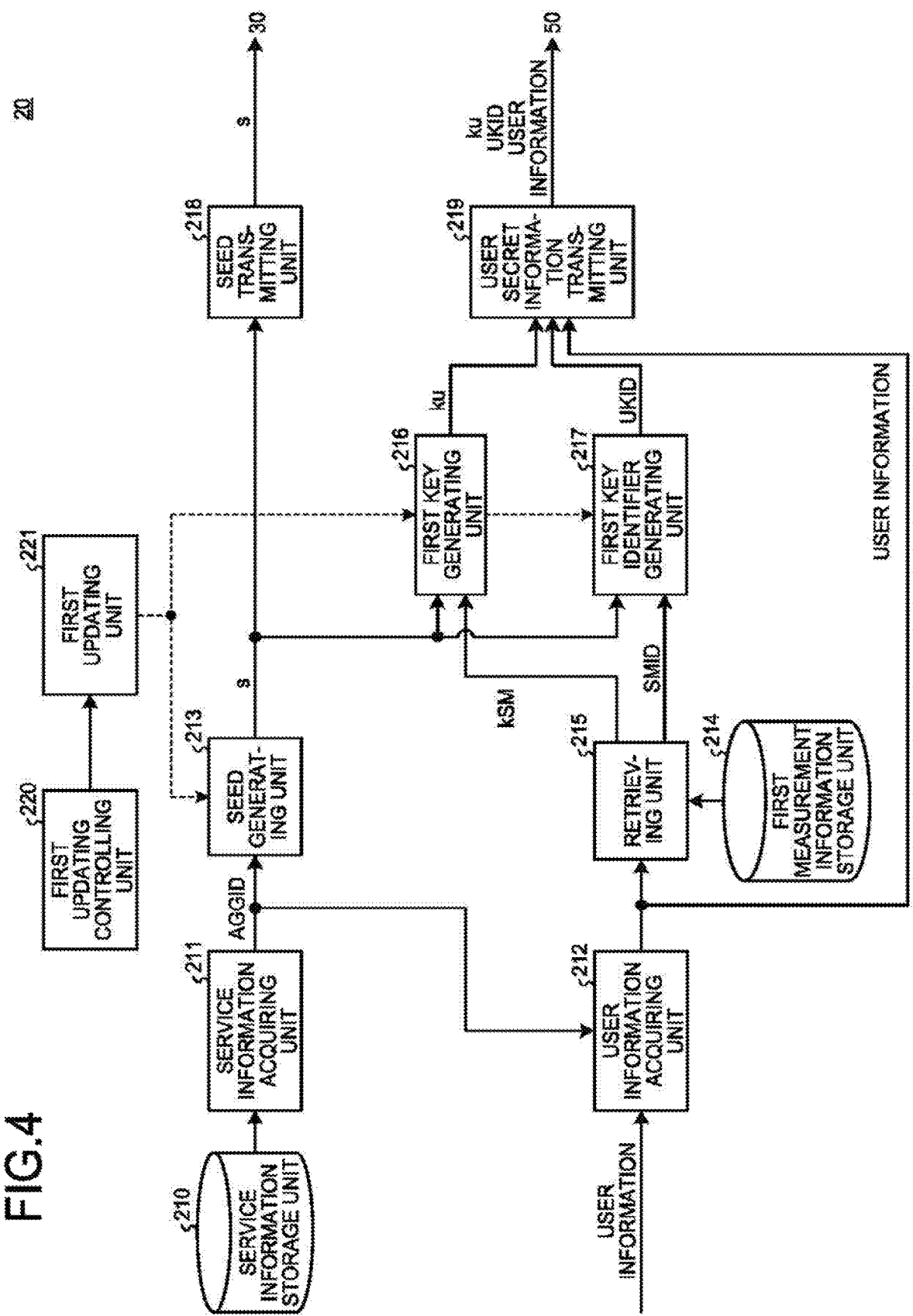
FIG. 4 is a schematic diagram of a configuration of management apparatus according to the first embodiment.

FIG. 4 is a schematic diagram illustrating a configuration of the management apparatus 20 according to the first embodiment. The management apparatus 20 includes a service information storage unit 210, a service information acquiring unit 211, a user information acquiring unit 212, a seed generating unit a first measurement information storage unit 214, a retrieving unit 215, a first key generating unit 210, a first key identifier generating unit 217, a seed transmitting unit 218, a user secret information transmitting unit 219, a first updating controlling unit 220, and a first updating unit 221.

The service information storage unit 210 stores therein a service providing apparatus identifier AGGID for each of the service providing apparatuses 50. In this manner, the service information storage unit 210 can store therein the service providing apparatus identifier AGGID in a shared manner with the service providing apparatus 50. The service information acquiring unit 211 acquires the service providing apparatus identifier AGGID of a service providing apparatus 50 providing a service from the service information storage unit 210. The service information acquiring unit 211 may retrieve the service providing apparatus identifier AGGID by acquiring the information of the corresponding service providing apparatus 50 from the service providing apparatus 50 via an encrypted communication, or by causing an operator to input the information. Alternatively, the service information acquiring unit 211 may acquire the service providing apparatus identifier AGGID directly from an operator or an external device. It is also possible to cause the management apparatus 20 to generate a different service providing apparatus identifier AGGID for each of the service providing apparatuses 50, and to store the service providing apparatus identifier AGGID in the service information storage unit 210.

The user information acquiring unit 212 acquires the user information of a user to whom the service is provided by the service providing apparatus 50 that corresponds to the service providing apparatus identifier AGGID acquired by the service information acquiring unit 211. The user information acquiring unit 212 may acquire the user information from the corresponding service providing apparatus 50 via an encrypted communication, cause an operator to enter the user information, or may store therein the user information in advance.

The seed generating unit 213 generates the seed information s using the service providing apparatus identifier AGGID acquired by the service information acquiring unit 211 and the random number r. The seed generating unit 213 generates the seed information s following the operation indicated as Equation (1) below, as an example.

$$s = H1(AGGID, r) \quad (1)$$

The function H1(x, y) is a function that generates one value by receiving x and y as inputs. The function H1(x, y) may be a unidirectional function receiving x and y as input values. Examples of the unidirectional function include sha-1, md5, sha256, or sha3-256. The function H1(x, y) may also be a keyed-hash function receiving x as a key, and y as a message. Examples of the keyed-hash function include hmac and omac. The function H1(x, y) may also be a pseudo random number generator receiving a bit sequence concatenating x and y as its input. Examples of the pseudo random number generator include Hash_DREG, HMAC_DREG, and CTR-DRBG.

The random number r may be any value not easily estimated by any third parties. The random number r may be a physical random number acquired by measuring a physical behavior of a connected device, as an example. The random number r may also be time information such as the number of seconds elapsed from "Jan. 1, 2012", "14:35:46, Jan. 1, 2012", or the UNIX (registered trademark) time (00:00:00, Jan. 1, 1970 (GMT)). The random number r may also be an output resultant of inputting a concatenation of the seed information s, the user key ku, the user key identifier UKID having used previously to an update, and a bit sequence acquired from these pieces of information to a pseudo random number generator.

The seed generating unit 213 may also generate the random number r based on the information received from a device to which the management apparatus 20 is connected, or from a device connected via a communication I/F. In the embodiment, the seed generating unit 213 uses a value output by inputting the time information acquired from the external at the time of a system startup to a pseudo random number generator, as the random number r.

The seed generating unit 213 may also generate the seed information s only from the random number r, without using the method described above. In such a case, however, the seed generating unit 213 needs to generate the seed information s in such a manner that different seed information s is generated for each the service providing apparatuses 50. For example, every time the seed information s is generated, the seed generating unit 213 may compare the pieces of seed information s corresponding to the different service providing apparatuses 50, and regenerate the random number if the seed information s is detected to be the same.

The first measurement information storage unit 214 stores therein, for each of the users, the user information, and a pair of the measurement apparatus individual key kSM and the measurement apparatus identifier SMID. The first measurement information storage unit 214 can store therein the measurement apparatus individual key kSM and the measurement apparatus identifier SMID in a manner shared with the measurement apparatus 30.

The retrieving unit 215 receives the user information acquired by the user information acquiring unit 212. The retrieving unit 215 then reads the measurement apparatus individual key kSM and the measurement apparatus identifier ID that are paired with the received user information from the first measurement information storage unit 214. As an example, the retrieving unit 215 compares the name and the address of the representative included in the received user information with the name and the address of the representative included in the user information stored in the first measurement information storage unit 214, and reads the measurement apparatus individual key kSM and the measurement apparatus identifier MID that are associated with the matching user information.

The first key generating unit 216 generates a user key ku using the measurement apparatus individual key kSM read by the retrieving unit 215, and the seed information s generated by the seed generating unit 213. The first key generating unit 216 generates the user key ku following the operation indicated as Equation (2) below, as an example.

$$ku = H2(kSM, s) \quad (2)$$

The function H2(x, y) is a function that generates one value by receiving x and y as inputs. The function H2(x, y) may be a unidirectional function receiving x and y as input values. Examples of the unidirectional function include sha-1, md5, sha256, and sha3-256. The function H2(x, y) may be a keyed-hash function receiving x as a key, and y as a message. Examples of the keyed-hash function include hmac and omac.

The first key identifier generating unit 217 generates a user key identifier UKID using the measurement apparatus identifier SMID read by the retrieving unit 215, and the seed information s generated by the seed generating unit 213. The first key identifier generating unit 217 generates the user key identifier UKID following the operation indicated as Equation (3) below, as an example.

$$UKID = H3(SMID, s) \quad (3)$$

The function H3(x, y) is a function that generates one value by receiving x and y as inputs. The function H3(x, y) may be a unidirectional function receiving x and y as input values. Examples of the unidirectional function include sha-1, md5, sha256, and sha3-256. The function H3(x, y) may be a keyed-hash function receiving x as a key, and y as a message. Examples of the keyed-hash function include hmac and omac.

Every time the first key generating unit 216 generates a user key ku, the first key identifier generating unit 217 generates a corresponding user key identifier UKID. In other words, the user key identifier UKID takes a different value for every user key ku, and functions as information for identifying the user key ku.

The first key identifier generating unit 217 may use the same seed information s if generated are different user key identifiers UKID. The first key identifier generating unit 217, however, needs to generate a different user key identifier UKID for each of the measurement apparatus identifiers SKID. Therefore, the function H3(x, y) needs to satisfy infectivity when x is limited to the domain of the measurement apparatus identifier SKID. Furthermore, the seed information used in generating the user key ku may be different from the seed information s used in generating the user key identifier UKID. In such a case, the seed transmitting unit 218 transmits the seed information s for the user key, and the seed information s for the user key identifier to the measurement apparatus 30 in a manner distinguishing each other.

If the function H3(x, y) does not satisfy infectivity, different user key identifiers UKID may be generated, for the respective measurement apparatus identifiers SMID, using a predetermined algorithm that is shared between the management apparatus 20 and the measurement apparatus 30. As an example, if there is SMID_1 and SMID_2 satisfying H3(SMID_1, s)=H3(SMID_2, s), the first key identifier generating unit 217 calls the seed generating unit 213. The first key identifier generating unit 217 then causes the seed generating unit 213 to generate new seed information s' satisfying H3(SMID_1, s')≠H3(SMID_2, s'), and a user key identifier UKID is generated using the new seed information s'.

The seed transmitting unit 218 transmits the seed information s generated by the seed generating unit 213 to the measurement apparatus 30 via the company network 60. In this case, the seed transmitting unit 219 may transmit the same seed information s to a plurality of measurement apparatuses 50 all at once via multicasting, for example. In this manner, the seed transmitting unit 213 can transmit the seed information s to the measurement apparatuses 30 with a relatively low communication load. The seed transmitting unit 218 may also transmit other types of information, as required, to the measurement apparatus 30 via the company network 60. As an example, the seed transmitting unit 213 may transmit a command instructing to perform an updating process to the measurement apparatus 30.

The user secret information transmitting unit 219 transmits the user key ku generated by the first key generating unit 216, the user key identifier UKID generated by the first key identifier generating unit 217, and the corresponding user information to the corresponding service providing apparatus 50 via the public network 70. In this case, the user secret information transmitting unit 219 transmits the user key ku, the user key identifier UKID, and the user information to the service providing apparatus 50 in a manner concealed from any third parties, using an encrypted communication or the like.

If the service providing apparatus 50 is capable of identifying a user, the user secret information transmitting unit 219 may transmit only a part of the user information, or transmit identification information other than the user information. When the identification information other than the user information is transmitted, the user information acquiring unit 212 may receive the information indicating the corresponding relation between the identification information and the user from the service providing apparatus 50 in advance, or the user information acquiring unit generate information indicating the corresponding relation between the identification information and the user, and transmit the corresponding relation to the service providing apparatus 50 in advance.

When the user secret information transmitting unit performs the process for a plurality of users in parallel, the user secret information transmitting unit 219 may transmit table data storing therein the user keys ku, and pairs of the user key identifier UKID and the user information to the service providing apparatus 50. The user secret information transmitting unit 219 may also omit transmitting the user information or the identification information, if the service providing apparatus 50 can identify the user from the transmitted information. For example, the user secret information transmitting unit may transmit table data storing therein pairs of the user key ku and the user key identifier UKID that are sorted in the order of the name of the representatives in a dictionary-like format, among the pieces of information included in the user information.

The user secret information transmitting unit 219 may transmit any ether information, as required, to the service providing apparatus 50 via the public network 70. The user secret information transmitting unit 219 may transmit a command instructing to perform an updating process to the service providing apparatus 50, as an example.

The first updating controlling unit 220 determines whether it has become necessary to update the user key ku. The first updating controlling unit 220 determines that it has become necessary to update the user key ku when a certain time has elapsed from the last update, or when a predetermined event occurs, as an example. Specifically, the first updating controlling unit 220 determines that it has become necessary to update the user key ku when the sequence number j used in generating the authentication information MAC of the measurement apparatus 30 overflows, when a preset valid period of the user key ku expires, when a request for disabling the user key ku has been received, or when the measurement apparatus individual key kSM is updated, for example.

When it has become necessary to update the user key ku, the first updating controlling unit 220 notifies the first updating unit 221. In the embodiment, while it is not necessary to update the user key ku, the first updating controlling unit 220 output an update notification flag with a value zero to the first updating unit 221. During the time other than that, the first updating controlling unit 220 outputs the update notification flag with a value one to the first updating unit 221. When the first updating unit 221 is capable of updating the user key ku using a plurality of schemes, the first updating controlling unit 220 may determine the updating scheme, and notify the first updating unit 221 of the update scheme.

When the first updating unit 221 receives a notification of an update of the user key ku from the first updating controlling unit 220 (for example, when the update notification flag with a value one is received), the first updating unit 221 calls the seed generating unit 213, the first key generating unit 216, and the first key identifier generating unit 217. The first updating unit 221 then causes the seed generating unit 213 to update the seed information s, causes the first key generating unit 216 to update the user key ku, and causes the first key identifier generating unit 217 to update the user key identifier UKID.

To make the update, the seed generating unit 213 generates new seed information s using the service providing apparatus identifier AGGID. The first key generating unit 216 then generates a new user key ku using the measurement apparatus individual key kSM and the new seed information s. The first key identifier generating unit 217 then generates a new user key identifier UKID using the measurement apparatus identifier SMID and the new seed information c.

The seed transmitting unit 218 transmits the new seed information s to the measurement apparatus 30 via the company network 60. In such a case, the seed transmitting unit 218 may transmit a command instructing to update to the measurement apparatus 30.

The user secret information transmitting unit 219 transmits the new user key ku, the new user key identifier UKID, and the corresponding user information to the corresponding service providing apparatus 50 via the public network 70. In such a case, the user secret information transmitting unit 219 may transmit a command instructing to update to the service providing apparatus 50.

Figure 5:
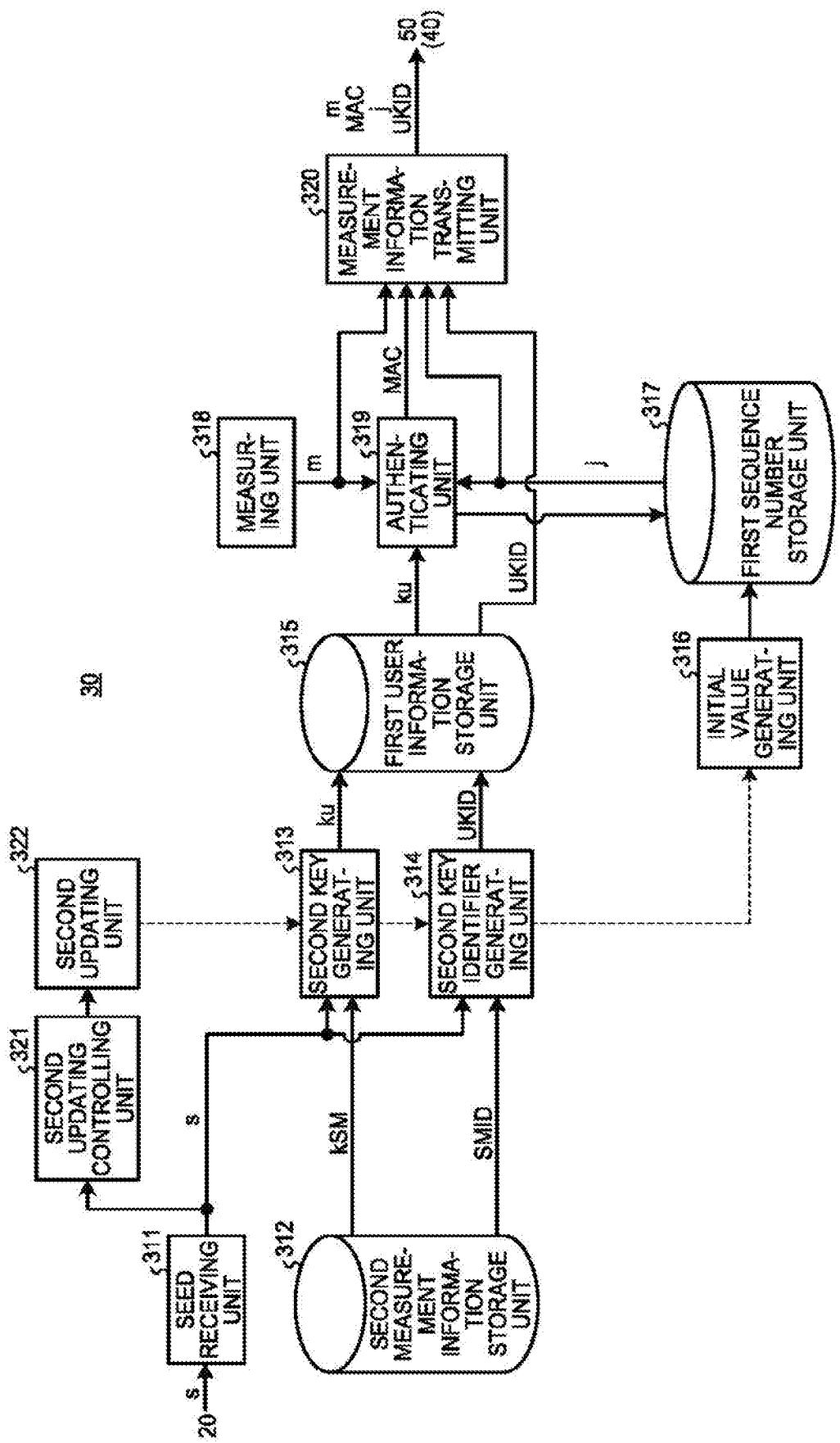
FIG. 5 is a schematic diagram of a configuration of a measurement apparatus according to the first embodiment.

FIG. 5 is a schematic diagram illustrating a configuration of the measurement apparatus 30 according to the first embodiment. The measurement apparatus 30 includes a seed receiving unit 311, a second measurement information storage unit 312, a second key generating unit 313, a second key identifier generating unit 314, a first user information storage unit 315, an initial value generating unit 316, a first sequence number storage unit 317, a measuring unit 318, a authenticating unit 319, a measurement information transmitting unit 320, a second updating controlling unit 321, and a second updating unit 322.

The seed receiving unit 311 receives the seed information s from the management apparatus 20 via the company network 60. The second measurement information storage unit 312 stores therein the measurement apparatus individual key kSM and the measurement apparatus identifier SMID of the measurement apparatus 30.

The second key generating unit 313 generates the user key ku using the measurement apparatus individual key kSM stored in the second measurement information storage unit 312, and the seed information s received by the seed receiving unit 311. The second key generating unit 313 generates the user key ku using a method with which the same result as that output from the first key generating unit 216 in the management apparatus 20 is acquired. The second key generating unit 313 may perform the same process as that performed by the first key generating unit 216, or may perform an accelerated process.

The second key identifier generating unit 314 generates the user key identifier UKID using the measurement apparatus identifier SMID stored in the second measurement information storage unit 312, and the seed information s received by the seed receiving unit 311. The second key identifier generating unit 314 generates the user key identifier UKID using a method with which the same result as that output from the first key identifier generating unit 217 in the management apparatus 20 is acquired. The second key identifier generating unit 314 may perform the same process as that performed by the first key identifier generating unit 217, or may perform an accelerated process.

The first user information storage unit 315 stores therein the user key ku generated by the second key generating unit 313, and the user key identifier UKID generated by the second key identifier generating unit 314.

Once the user key ku is updated, the initial value generating unit 316 generates an initial value of the sequence number j that is used in generating the authentication information MAC. The initial value generating unit 316 may generate an initial value as j=0 or j=1, so an example. The initial value generating unit 316 may also set the maximum value that can be handled as the initial value, or may use a random number as the initial value.

The first sequence number storage unit 317 stores therein the current value of the sequence number j to be used in generating the authentication information MAC.

The measuring unit 318 acquires the measurement information m representing the physical quantity of the target of the service provided to the user by the business entity. In the embodiment, the measuring unit 318 acquires the amount of electricity usage of each device being used by the user as the measurement information m. The measuring unit 318 may collect the amount of electricity usage per certain unit time, may collect the amount of electricity usage when a collection request is received from the communication apparatus 40, or may collect the amount of electricity usage when a command instructing to make a measurement is received from the management apparatus 20. The measuring unit 316 may start and end collecting the amount of electricity usage in response to a command from the management apparatus 20.

The authenticating unit 319 generates the authentication information MAC authenticating the legitimacy of the measurement information m, using the measurement information m acquired by the measuring unit 318, the user key ku stored in the first user information storage unit 315, and the sequence number j stored in the first sequence number storage unit 317. The authenticating unit 319 generates the authentication information MAC following the operation indicated as Equation (4) below, as an example.

$$MAC=H4(ku,m,j) \quad (4)$$

The function $H4(x, y, z)$ is a function that generates one value by receiving x, y, and z as inputs. The function $H4(x, y, z)$ may be a unidirectional function receiving x, y, and z as input values. Examples of the unidirectional function include sha-1, md5, sha256, and sha3-256. The function $H4(x, y, z)$ may be a keyed-hash function receiving x as a key, and y and z as a concatenated message. Examples of the keyed-hash function include hmac and omac.

The authenticating unit 319 updates the sequence number j stored in the first sequence number storage unit 317 every time the authentication information MAC is generated. The sequence number j is a number whose value is incremented (or decremented) every time the authentication information MAC is generated, for example, and may be value incremented or decremented by one every time the authentication information MAC is generated. It is also possible to configure the first sequence number storage unit 317 to store therein every sequence number j used in the past, and to cause the authenticating unit 319 to generate a different value other than those of the sequence number j used in the past, as the sequence number j. It is also possible to configure the authenticating unit 319 to transmit a flag indicating that the sequence number j can no longer be updated to the management apparatus 20, when the sequence number j can be no longer updated next time or subsequently to a certain number of times determined by an algorithm (for example, when an upcoming overflow is detected), as a result of this update.

When the authentication information MAC is to be generated, the authenticating unit 319 may call the second key generating unit 313 and the second key identifier generating unit 314, and causes the second key generating unit 313 and the second key identifier generating unit 314 to generate the user key ku and the user key identifier UKID, respectively. In such a configuration, the measurement apparatus 30 may be configured not to include the first user information storage unit 315.

The measurement information transmitting unit 320 passes the measurement information m, the authentication information MAC, the sequence number j, and the user key identifier UKID to the communication apparatus 40. The communication apparatus 40 transmits the measurement information m, the authentication information MAC, the sequence number j, and the user key identifier UKID received from the measurement apparatus 30 to the service providing apparatus 50 via the public network 70.

The measurement information transmitting unit 320 may also transmit other information, as required, to the service providing apparatus 50 via the communication apparatus 40 and the public network 70. For example, immediately after an update of the user key ku, the measurement information transmitting unit 320 may transmit a command indicating that the user key ku has just been updated, as well as the measurement information m and the like, to the service providing apparatus 50.

The second updating controlling unit 321 determines whether it has become necessary to update the user key ku. In the embodiment, the second updating controlling unit 321 determines that it has become necessary to update the user key ku when the seed receiving unit 311 has received the seed information s. The second updating controlling unit 321 may also determine whether it has become necessary to update the user key ku using the information stored in the measurement apparatus 30. For example, the second updating controlling unit 321 may determine that it has become necessary to update the user key ku only when it is determined that the current sequence number j stored in the first sequence number storage unit 317 is to overflow next time, or when an update is to exceed a certain number of times determined by a predetermined algorithm. The second updating controlling unit 321 may also determine whether it has become necessary to make an update using information received from a device to which the measurement apparatus 30 is connected, or from device connected via the communication I/F.

The second updating controlling unit 321 sends a notification to the second updating unit 322 when it becomes necessary to update the user key ku. In the embodiment, the second updating controlling unit 321 outputs an update notification flag with a value zero to the second updating unit 322 when it is not necessary to update the user key ku, and outputs an update notification flag with a value one to the second updating unit 322 during the time other than that. When the second updating unit 322 is capable of updating the user key ku using a plurality of schemes, the second updating controlling unit 321 may determine the updating scheme, and notify the second updating unit 322 of the update scheme.

When the second updating unit 322 receives a notification of an update of the user key ku from the second updating controlling unit 321 (for example, when the update notification flag with a value one is received), the second updating unit 322 calls the second key generating unit 313 and the second key identifier generating unit 314. The second updating unit 322 then causes the second key generating unit 313 to update the user key ku, and causes the second key identifier generating unit 314 to update the user key identifier UKID.

To make the update, the second key generating unit 313 generates a new user key ku using the measurement apparatus individual key kSM, and the received new seed information s. The second key identifier generating unit 314 generates a new user key identifier UKID using the measurement apparatus identifier SMID, and the received new seed information s.

The second updating unit 322 also discards the current sequence number j stored in the first sequence number storage unit 317, calls the initial value generating unit 316, and causes the initial value generating unit 316 to generate the initial value of the sequence number j. In such a case, the initial value generating unit 316 stores the generated initial value in the first sequence number storage unit 317.

Figure 6:
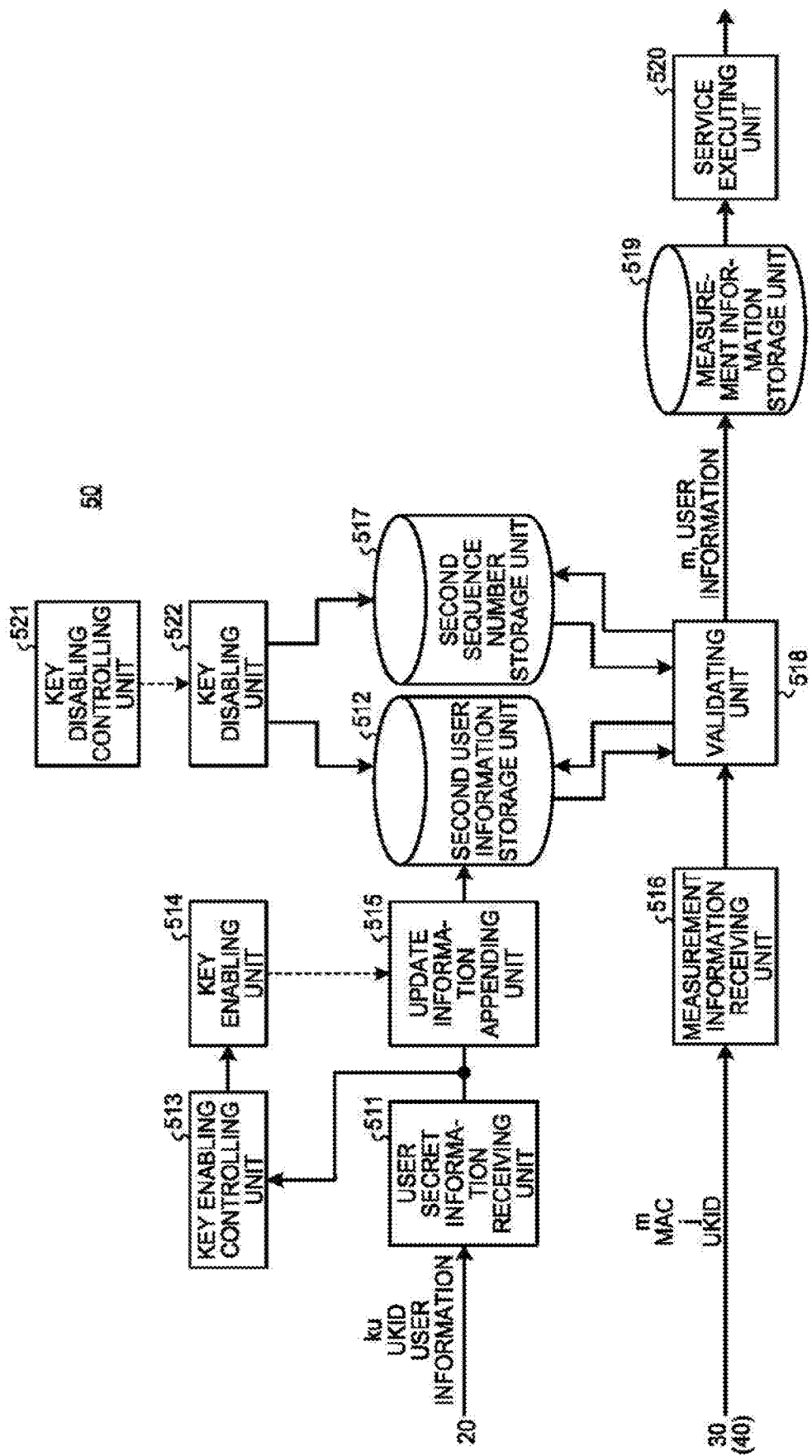
FIG. 6 is a schematic diagram of a configuration service providing apparatus according to the first embodiment.

FIG. 6 is a schematic diagram illustrating a configuration of the service providing apparatus 50 according to the first embodiment. The service providing apparatus 50 includes a user secret information receiving unit 511, a second user information storage unit 512, a key enabling controlling unit 513, a key enabling unit 514, an update information appending unit 515, a measurement information receiving unit 516, a second sequence number storage unit 517, a validating unit 518, a measurement information storage unit 519, a service executing unit 520, a key disabling controlling unit 521, and a key disabling unit 522.

The user secret information receiving unit 511 receives the user key ku, the user key identifier UKID, and the user information from the management apparatus 20 via the public network 70. In this case, the user secret information receiving unit 511 receives the user key ku, the user key identifier UKID, and the user information in a manner concealed from any third parties, using an encrypted communication, for example.

The second user information storage unit 512 stores therein, for each user who is to be provided with the information processing service of the service providing apparatus 50, the user key ku and the user key identifier UKID in association with each other that are received by the user secret information receiving unit 511, and have order information and a usage flag appended by the update information appending unit 515. When the update information appending unit 515 stores a pair of a new user key ku and a new user key identifier UKID in the second user information storage unit 512, a pair of the user key ku and the user key identifier UKID already stored are kept in the second user information storage unit 512, without being deleted. As a result, the second user information storage unit 512 may store therein a plurality of pairs of the user key ku and the user key identifier UKID for one user.

The key enabling controlling unit 513 determines whether it has become necessary to update the user key ku stored in the second user information storage unit 512. In the embodiment, the key enabling controlling unit 513 determines that it has become necessary to update the user key ku when the user secret information receiving unit 511 receives the new user key ku from the management apparatus 20.

The key enabling controlling unit 513 sends a notification to the key enabling unit 514 when it has become necessary to update the user key ku. In the embodiment, the key enabling controlling unit 513 outputs an update notification flag with a value zero to the key enabling unit 514 while it is not necessary to update the user key ku. During the time other than that, the key enabling controlling unit 513 outputs an update notification flag with a value set to one to the key enabling unit 514. When the key enabling unit 514 is capable of updating the user key ku using a plurality of schemes, the key enabling controlling unit 513 may determine the updating scheme, and may notify the key enabling unit 514 of the update scheme.

When the key enabling unit 514 receives a notification to update the user key ku from the key enabling controlling unit 513 (for example, when the update notification flag with a value one is received), the key enabling unit 514 calls the update information appending unit 515.

Upon being called by the key enabling unit 14, the update information appending unit 515 appends update-related information to the new user key ku, and writes the new user key ku and the new user key identifier UKID to the second user information storage unit 512.

The update information appending unit 515 receives the user key ku, the user key identifier UKID, and the user information received by the user secret information receiving unit 511. When other information for identifying the user is received, instead of the user information, from the user secret information receiving unit 511, for example, the update information appending unit 515 identifies the user based on the other information.

The update information appending unit 515 appends order information capable of identifying an update order to the new user key ku received by the user secret information receiving unit 511. The order information may be information indicating time at which the user key ku is received from the management apparatus 20, as an example. The order information may also be a numerical value representing the order at which the user key ku is received, as an example.

The update information appending unit 515 also appends information indicating that the user key has not been used to the new user key ku received by the user secret information receiving unit 511. In the embodiment, the update information appending unit 515 appends a usage flag with a value set to zero to the received new user key ku.

The update information appending unit then writes the user key ku appended with the order information and the usage flag, and the user key identifier UKID to the second user information storage unit 512, in a manner associated with the identified user.

The measurement information receiving unit 516 receives the measurement information m, the authentication information MAC, the sequence number j, and the user key identifier UKID from the measurement apparatus 30 via the communication apparatus 40 and the public network 70.

The second sequence number storage unit 517 stores therein, for each user key identifier UKID, the sequence number j received by the measurement information receiving unit 516. The second sequence number storage unit 517 stores the sequence number j when the validating unit 518 determines that the measurement information m is legitimate, and does not store the sequence number j when the measurement information m is determined not to be legitimate.

The validating unit 518 validates whether the measurement information m received by the measurement information receiving unit 516 from the measurement apparatus 30 is legitimate. In other words, the validating unit 518 validates the measurement information m received by the measurement information receiving unit 516 from the measurement apparatus 30 has not been manipulated.

Specifically, the validating unit 518 generates validating authentication information MAC', using the user key ku stored in the second user information storage unit 512, the measurement information m received by the measurement information receiving unit 516, and the sequence number j received by the measurement information receiving unit 516, and following the same process as that followed by the authenticating unit 319 in the measurement apparatus 30. The validating unit 518 then compares the generated validating authentication information MAC' with the authentication information MAC received from the measurement apparatus 30, and, if these pieces of information do not match, the validating unit 518 determines that the measurement information m is not legitimate.

When these pieces of information match, the validating unit 518 further determines whether the sequence number j received by the measurement information receiving unit 516 is stored in the second sequence number storage unit 517 in a manner associated with the user key identifier UKID received by the measurement information receiving unit 516. If the received sequence number j is stored in a manner associated with the received user key identifier UKID, the validating unit 518 determines that the measurement information m is not legitimate.

If the validating authentication information MAC' and the received authentication information MAC match, and if the received sequence number j is not stored in a manner associated with the received user key identifier UKID, the validating unit 518 determines that the received measurement information m is legitimate. In other words, in this case, the validating unit 518 determines that the received measurement information m has not been manipulated.

If the received measurement information m is determined to be legitimate, the validating unit 518 stores the received sequence number j in the second sequence number storage unit 517 in a manner associated with the received user key identifier UKID.

If the received measurement information m has been determined to be legitimate, the validating unit 518 retrieves the user information associated with the received user key identifier UKID from the second user information storage unit 512. The validating unit 518 then stores the received measurement information m in the measurement information storage unit 510 in a manner associated with the user information acquired as a result of retrieving.

If the received measurement information m has been determined to be legitimate, the validating unit 518 also appends information indicating that the user key has been already used to the user key ku stored in a manner associated with the received user key identifier UKID in the second user information storage unit 512. In the embodiment, if the value of the usage flag associated with the user key ku is zero, the validating unit 516 rewrites the value of the usage flag to one. If the measurement apparatus 30 will be no longer able to update the sequence number next time, or subsequently to a certain number of times determined by an algorithm determining such a number as a result of this update (for example, when it is detected that the sequence number will overflow), the validating unit 518 may transmit a flag indicating that the sequence number can no longer be updated to the management apparatus 20.

Using the measurement information m validated to be legitimate stored in the measurement information storage unit 519, the service executing unit 520 executes the process of providing the service to the user at which the measurement apparatus 30 having transmitted the measurement information m is deployed. The service executing unit 520, as an example, performs the information processing for billing for the amount of electricity usage, or the information processing for the demand response, for example, based on the amount of electricity usage per unit time.

The key disabling controlling unit 521 determines whether it has become necessary to delete the user key ku having remained unused. As an example, the key disabling controlling unit 521 determines that it has become necessary to delete the user key ku when a certain time has elapsed from when the user key is deleted last time, or when a predetermined event occurs. Specifically, the key disabling controlling unit 521 determines that it has become necessary to delete the user key ku when an update of the user key ku of the measurement apparatus 30 has been committed as a result of the validation process performed by the validating unit 516 (for example, when the value of the usage flag is rewritten from zero to ore), when a signal indicating to delete the old user key ku is received from the management apparatus 20, or when there is a leakage of the old user key, and there is a possibility for illegitimate use of the user key, for example. The key disabling controlling unit 521 may also be provided with a mechanism for detecting an update failure in the measurement apparatus 50 using information such as a usage flag. For example, the key disabling controlling unit 521 may determine that an update of the user key ku of the measurement apparatus 30 has failed when a certain time period has elapsed from when the user key is appended with a usage flag with a value zero, and notify the management apparatus 20 of the update failure.

The key disabling unit 522 deletes a pair of a user key ku having remained unused and the user key identifier UKID from the second user information storage unit 512. The key disabling unit 522 also deletes the sequence number j having remained unused from the second sequence number storage unit 517.

Specifically, the key disabling unit 522 acquires, for each user, the user keys ku appended with information indicating that the user key has been used (in the embodiment the user key ku with a usage flag with a value one), and identifies the user key ku having the latest order information (such as time information) from the acquired user keys ku. The key disabling unit 522 then deletes the pairs of the user key ku appended with a usage flag with a value one and the user key identifier UKID, except for the identified latest user key ku. The key disabling unit 522 then deletes the sequence numbers j that are stored in a manner associated with the deleted user key identifiers UKID from the second sequence number storage unit 517.

Figure 7:
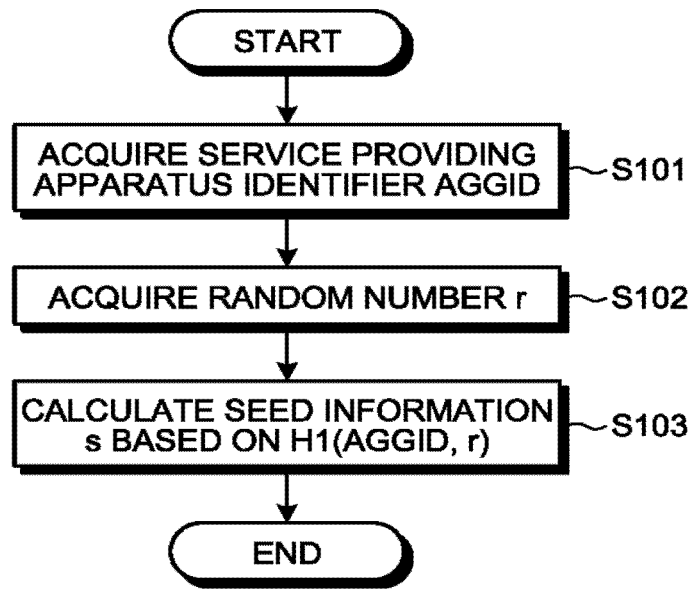
FIG. 7 is a flowchart of a generation of seed information.

FIG. 7 is a flowchart of a generation the seed information s. To generate the seed information s, the management apparatus 20 executes the process at Step S101 to Step S103 in FIG. 7.

To begin with, the service information acquiring unit 211 acquires the service providing apparatus identifier AGGID from the service information storage unit 210 (Step S101). The seed generating unit 213 then acquires the random number r (Step S102). The seed generating unit 213 then generates the seed information s by performing the operation of H1(AGGID, r) using the service providing apparatus identifier AGGID and the random number r (Step S103).

Figure 8:
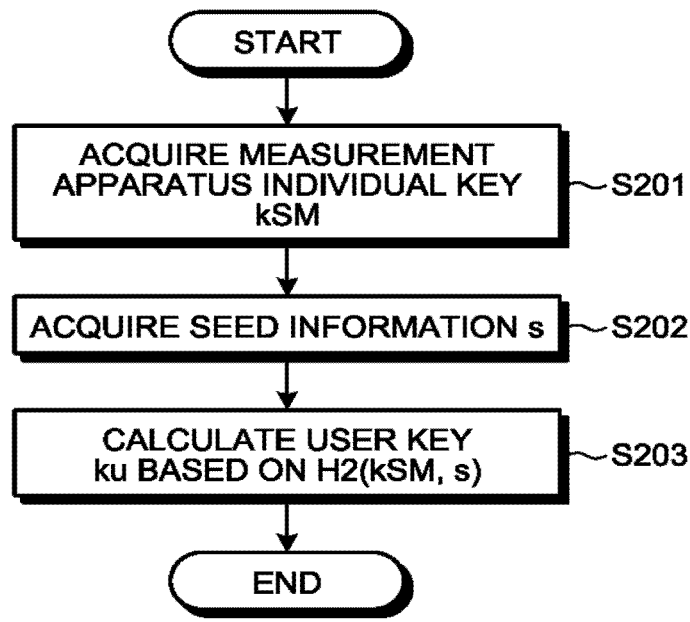
FIG. 8 is a flowchart of a generation of a user key.

FIG. 8 is a flowchart of a generation of the user key ku. To generate a user key ku, the management apparatus 20 and the measurement apparatus 30 execute the process at Step S201 to Step S203 in FIG. 8.

To begin with, a process of generating a user key ku in the management apparatus 20 will be explained. The retrieving unit 213 acquires the measurement apparatus individual key kSM from the first measurement information storage unit 214 (Step S201). The first key generating unit 210 then acquires the seed information s generated by the seed generating unit 213 (Step S202). The first key generating unit 216 then generates a user key ku by performing the operation of H2(kSM, s) using the measurement apparatus individual key kSM and the seed information s (Step S203). The user secret information transmitting unit 219 then transmits the generated user key ku to the service providing apparatus 50.

The process of generating a user key ku in the measurement apparatus 30 will now be explained. The second key generating unit 313 acquires the measurement apparatus individual key kSM from the second measurement information storage unit 312 (Step S201). The second key generating unit 313 then acquires the seed information s received by the seed receiving unit 311 (Step S202). The second key generating unit 313 then generates a user key ku by performing the operation of H2(kSM, s) using the measurement apparatus individual key kSM and the seed information s (Step S203). The second key generating unit 313 then stores the generated user key ku in the first user information storage unit 315.

Figure 9:
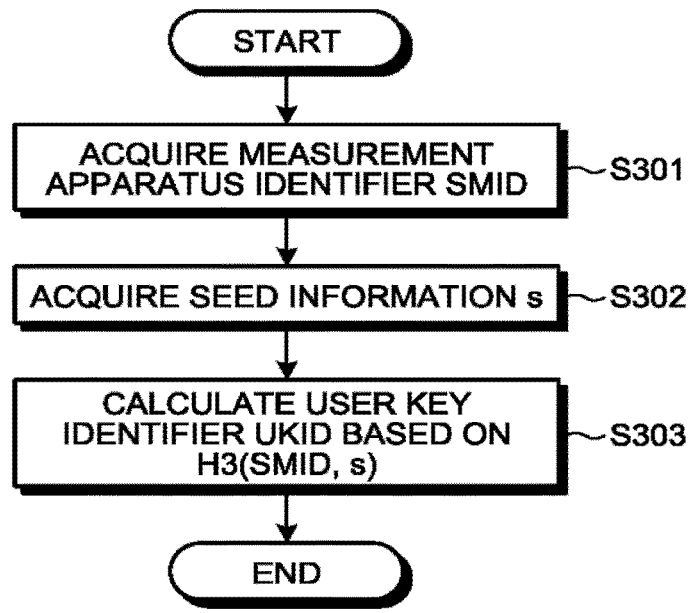
FIG. 9 is a flowchart of a generation of a user key identifier.

FIG. 9 is a flowchart of a generation of the user key identifier UKID. To generate the user key identifier UKID, the management apparatus 20 and the measurement apparatus 30 execute the process at Step S301 to Step S303 in FIG. 9.

To begin with, the process of generating a user key identifier UKID in the management apparatus 20 will now be explained. The retrieving unit 215 acquires the measurement apparatus identifier SMID from the first measurement information storage unit 214 (Step S301). The first key identifier generating unit 217 then acquires the seed information s generated by the seed generating unit 213 (Step S302). The first key identifier generating unit 217 then generates a user key identifier UKID by performing the operation of H3(SMID, s) using the measurement apparatus identifier SHIP and the seed information s (Step S303). The user secret information transmitting unit 219 then transmits the generated user key identifier UKID to the service providing apparatus 50.

The process of generating the user key identifier UKID in the measurement apparatus 30 will now be explained. The second key identifier generating unit 314 acquires the measurement apparatus identifier SMID from the second measurement information storage unit 312 (Step S301). The second key identifier generating unit 314 then acquires the seed information s received by the seed receiving unit 311 (Step S302). The second key identifier generating unit 314 then generates a user key identifier UKID by performing the operation of H3(SMID, s) using the measurement apparatus identifier SMID and the seed information s (Step S303). The second key identifier generating unit 314 then stores the generated user key identifier UKID in the first user information storage unit 315.

Figure 10:
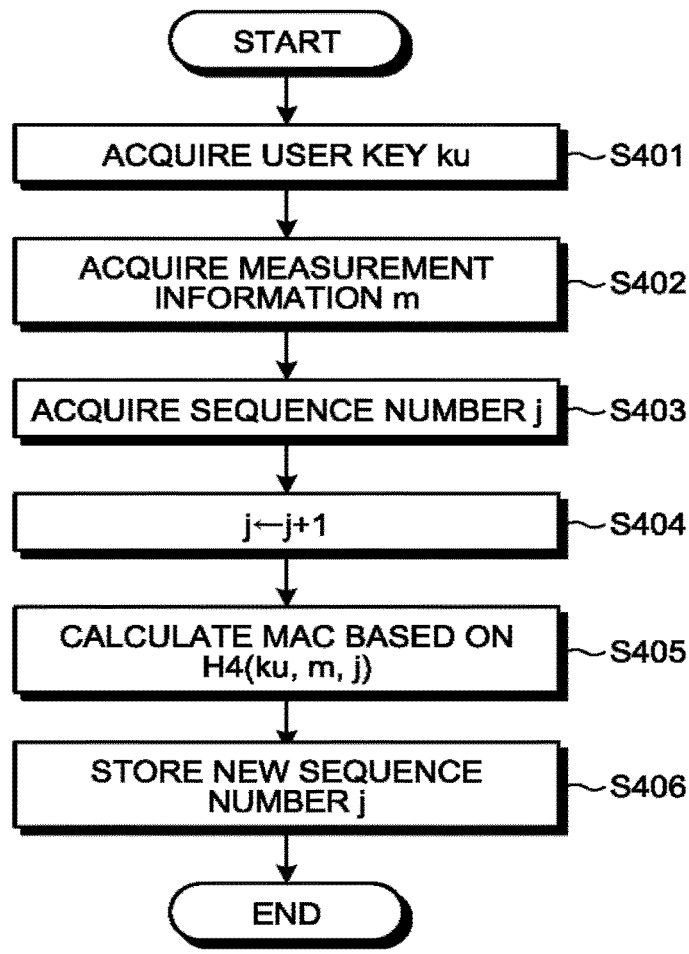
FIG. 10 is a flowchart of a generation of authentication information.

FIG. 10 is a flowchart of a generation of authentication information MAC. To generate authentication information MAC, the measurement apparatus 30 executes the process at Step S401 to Step S406 in FIG. 10.

To begin with, the authenticating unit 319 acquires the user key ku from the first user information storage unit 315 (Step S401). The authenticating unit 319 then acquires the measurement information m from the measuring unit 318 (Step S402). The authenticating unit 319 then acquires the sequence number j from the first sequence number storage unit 317 (Step S403). The authenticating unit 319 then updates the sequence number j. In the embodiment, the authenticating unit 319 generates a new sequence number j by adding one to the sequence number j (Step S404).

The authenticating unit 319 then generates authentication information MAC by performing the operation of H4(ku, m, j), using the user key ku, the measurement information m, and the new sequence number j (Step S405). The authenticating unit 319 then stores the new sequence number j in the first sequence number storage unit 317 (Step S406).

Figure 11:
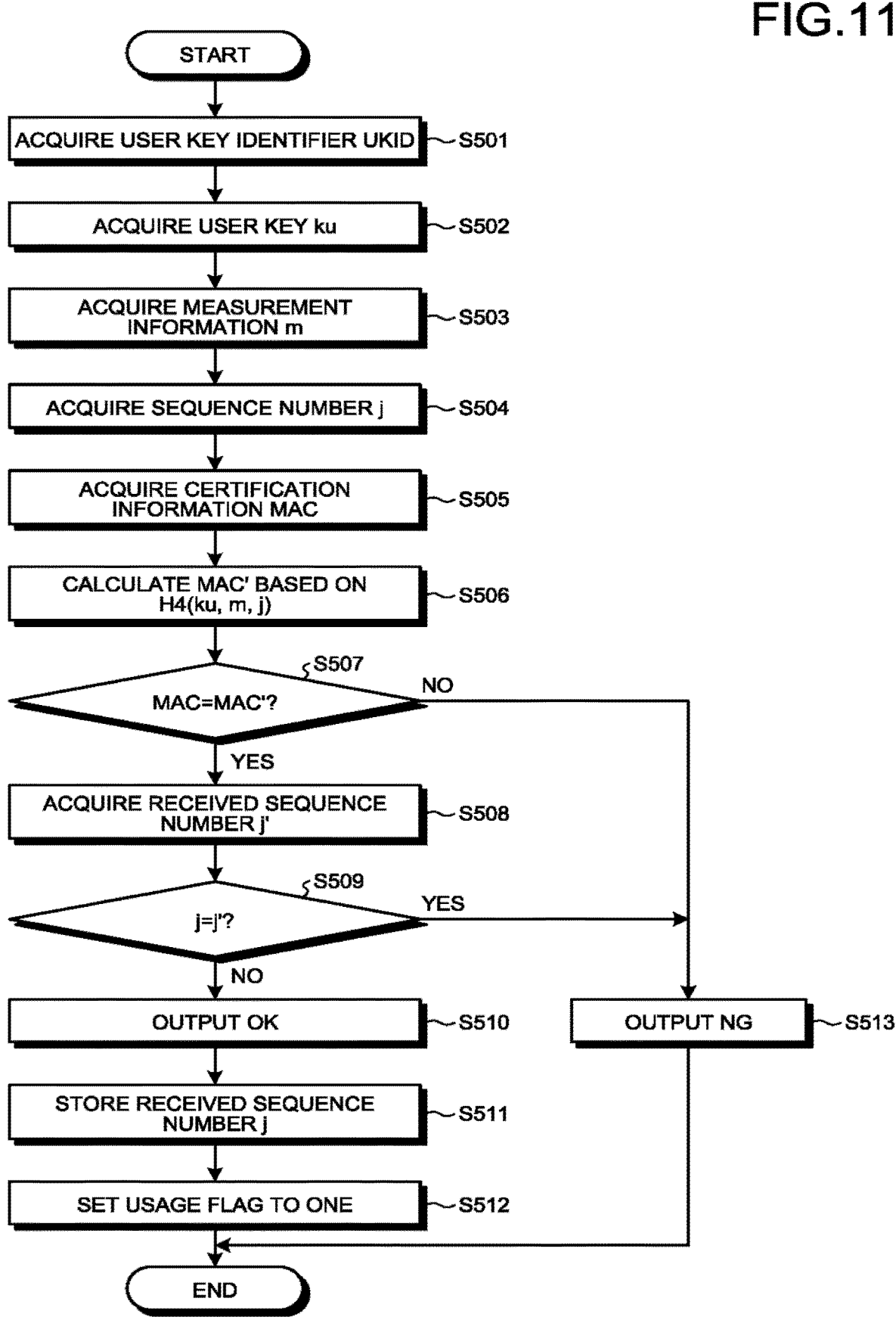
FIG. 11 is a flowchart of a validation process.

FIG. 11 is a flowchart of a validation process. To validate the measurement information m received from the measurement apparatus 30, the service providing apparatus 50 executes the process at Step S501 to Step S513 in FIG. 11.

To begin with, the validating unit 518 acquires the user key identifier UKID from the measurement information receiving unit 516 (Step S501). The validating unit 518 then acquires the user key ku associated with the acquired user key identifier UKID from the second user information storage unit 512 (Step S502).

The validating unit 518 then acquires the measurement information m from the measurement information receiving unit 516 (Step S503). The validating unit 518 then acquires the sequence number j from the measurement information receiving unit 516 (Step S504). The validating unit 518 then acquires the authentication information MAC from the measurement information receiving unit 516 (Step S505).

The validating unit 518 then generates validating authentication information MAC' by performing the operation of H4(ku, m, j) using the user key ku, the measurement information m, and the sequence number j (Step S506). The validating unit 518 then determines whether the received authentication information MAC and the generated validating authentication information MAC' match (Step S507). If these pieces of information do not match (No at Step S507), the validating unit 516 outputs a result indicating that the validation has failed (NG), and the process is ended (Step S513).

If these pieces of information match (Yes at Step S507), the validating unit 516 acquires sequence numbers j' having been received and stored in a manner associated with the received user key identifier UKID from the second sequence number storage unit 517 (Step S506). The validating unit 518 then determines whether the received sequence number j and any one of the sequence numbers j' having been already received match (Step S509). If these pieces of information match (Yes at Step S509), the validating unit 513 outputs a result indicating that the validation has failed (NG), and the process is ended (Step S513).

If these pieces of information do not match (No at Step S509), the validating unit 518 outputs a result indicating that the validation has passed (OK) (Step S510). The validating unit 518 then stores the received sequence number j in the second sequence number storage unit 517 as a sequence number having already been received (Step S511). The validating unit 518 then sets the value of the usage flag stored in a manner associated with the user key ku in the second user information storage unit 512 to one (Step S512).

Figure 12:
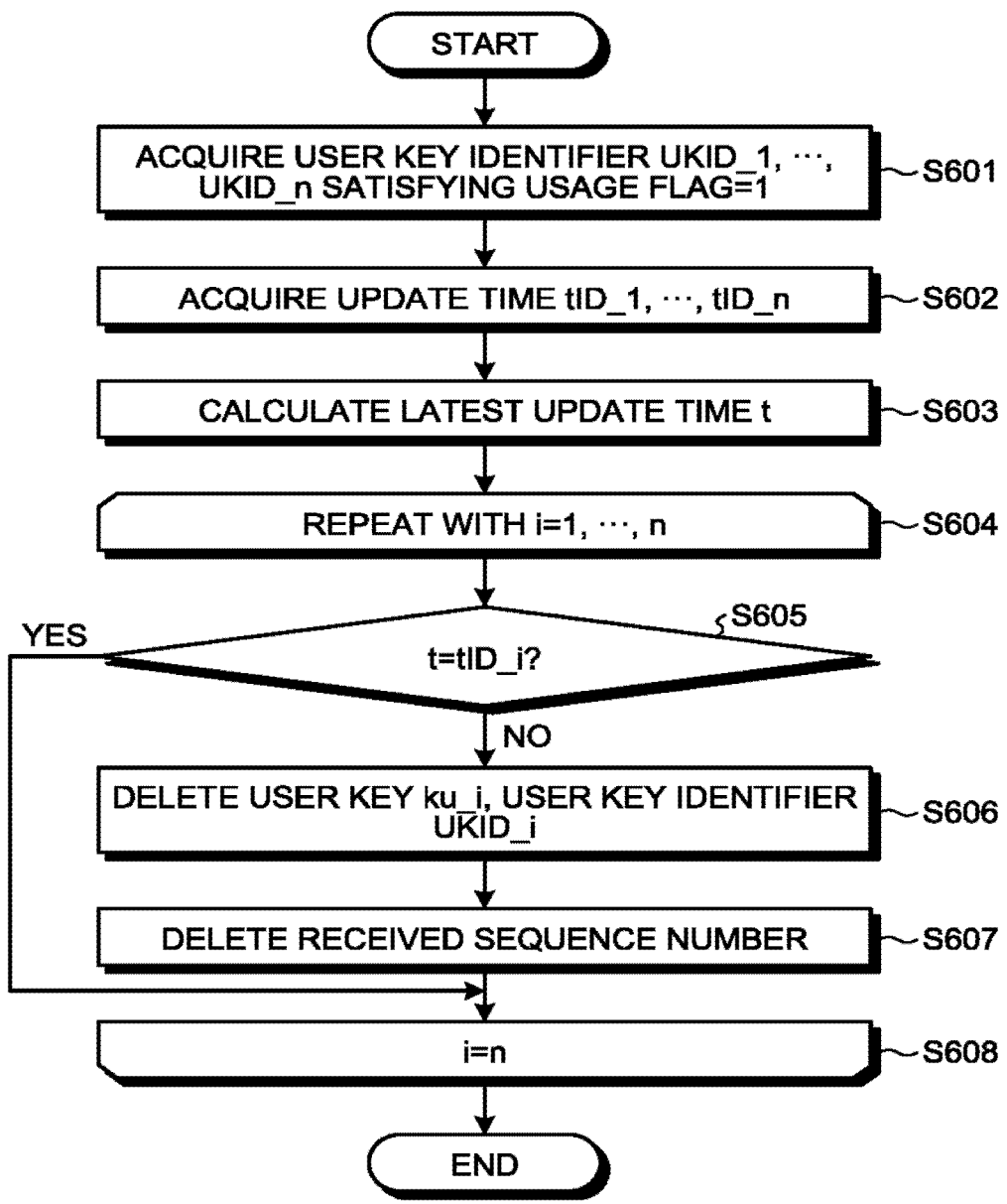
FIG. 12 is a flowchart of a key disabling process.

FIG. 12 is a flowchart of a key disabling process performed in the service providing apparatus 50 according to the first embodiment. To disable a user key ku having been used before an update, for example, the service providing apparatus 50 executes the process at Step S601 to Step S608 in FIG. 12.

To begin with, the key disabling unit 522 acquires all of the user key identifiers UKID_1, . . . UKID_n with a usage flag having a value one, among the user key identifiers UKID stored in a manner associated with the same user information in the second user information storage unit 512

(Step S601). The key disabling unit 522 then acquires the update time tID_1, . . . , tID_n of the respective acquired user key identifiers UKID_1, . . . , UKID_n (Step S602). The key disabling unit 522 then calculates the latest update time t, among the acquired update time tID_1, . . . , tID_n (Step S602).

The key disabling unit 522 then increments a variable i by one from one, and repeats the process at Step S605 to Step S607 until i becomes equal to n loop between Step S604 and Step S606). At Step S605 in the loop, the key disabling unit 522 determines whether the latest update time t and the update time tID_i match. If the latest update time t and the update time tID_i matches (Yes at Step S605), the key disabling unit 522 sets i to the next value without performing the processes at Step S606 and Step S607. If the latest update time t and the update time tID_i does not match (No at Step S605), at Step S606, the key disabling unit 522 deletes the user key ku_i and the user key identifier UKID_i from the second user information storage unit 512. At Step S607, the key disabling unit 522 then deletes every received sequence number associated with the user key identifier UKID_i from the second sequence number storage unit 517.

As described above, in the transfer system 10 according to the embodiment, the management apparatus 20 generates seed information s for each of the service providing apparatuses 50. The management apparatus 20 also generates a user key ku for each of the measurement apparatuses 30 using the measurement apparatus individual key kSM and the seed information s, and generates a user key identifier UKID using the measurement apparatus identifier SMID and the seed information s. The management apparatus 20 then transmits the seed information s to the respective measurement apparatuses 30, and transmits the user key ku and the user key identifier UKID to the service providing apparatus 50.

Each of the measurement apparatuses 30 generates a user key ku using its measurement apparatus individual key kSM and the received seed information s, and generates a user key identifier UKID using its measurement apparatus identifier SMID and the received seed information s. Each of the measurement apparatuses 30 then generates the authentication information MAC, for the measurement information m using the user key ku, and transmits the measurement information m, the authentication information MAC, and the user key identifier UKID to the service providing apparatus 50.

The service providing apparatus 50 receives the user key ku and the user key identifier UKID from the management apparatus 20. When the measurement information m, the authentication information MAC, and the user key identifier UKID are received from the measurement apparatus 30, the service providing apparatus 50 validates the measurement information m using the user key ku having the same user key identifier UKID and received from the management apparatus 20. As a result of this validation, if the measurement information m is legitimate (has not been manipulated), the service providing apparatus 50 then provides the information processing service using the measurement information m.

In this manner, with the transfer system 10, a secret key can be shared, and the legitimacy of the measurement information m can be validated without performing the mutual authentication and the like between the service providing apparatus 50 and the measurement apparatus 30. This enables the transfer system 10 to prevent any manipulation of the measurement information m, easily.

Furthermore, in the transfer system 10, the measurement information m is transmitted to the service providing apparatus 50 via the public network 70. This enables the transfer system 10 to alleviate the limitation imposed by the communication channel, and to transfer at a high speed a large amount of the measurement information m from the measurement apparatuses 30 to the service providing apparatus 50.

Furthermore, in the transfer system 10, the management apparatus 20 transmits the seed information s to a plurality of measurement apparatuses 30. Because the management apparatus 20 can transmit one piece of data that is not dependent on the measurement apparatuses 30 to the measurement apparatuses 30, the communication load on the company network 60 can be reduced.

As described above, with the transfer system 10 according to the embodiment, the measurement information m acquired by the measurement apparatus 30 can be transmitted securely and easily to the service providing apparatus 50.

Modification

A modification of the first embodiment will now be explained. Because the modification of the first embodiment has substantially the same functions and configuration as the transfer system 10 explained with reference to FIGS. 1 to 12, substantially the same elements will be given the same reference signs, and detailed explanations thereof, except for the difference, will be omitted.

Figure 13:
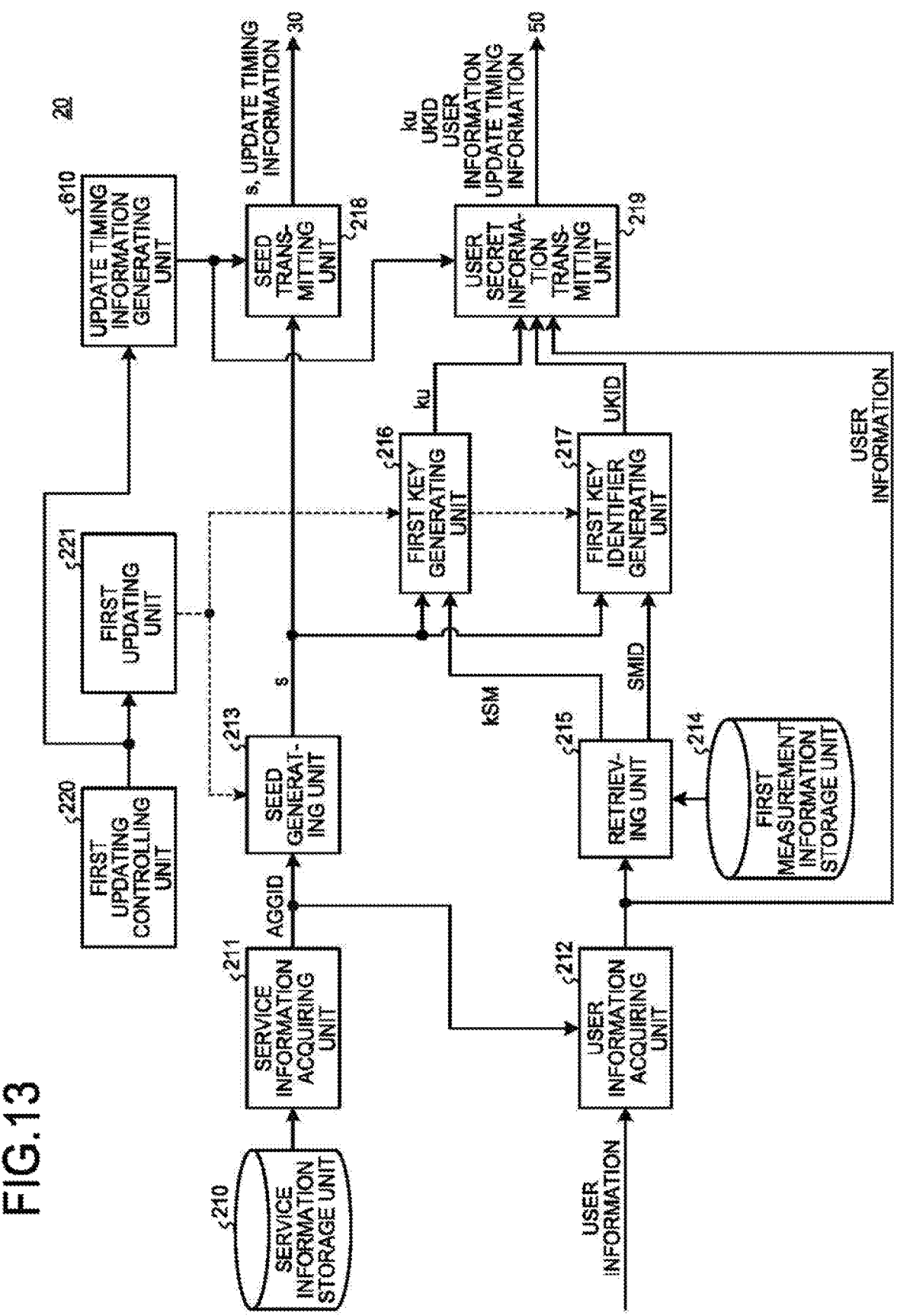
FIG. 13 is a schematic diagram of a configuration of management apparatus according to a modification of the first embodiment.

FIG. 13 is a schematic diagram illustrating a configuration of the management apparatus 20 according to the modification of the first embodiment. The management apparatus 20 according to the modification of the first embodiment further includes an update timing information generating unit 610, in addition to the management apparatus 20 illustrated in FIG. 4.

When it has become necessary to update the user key ku, the first updating controlling unit 220 sets the value of the update notification flag to one, for example, and notifies the update timing information generating unit 610. If the notification is received from the first updating controlling unit 220 (if the value of the update notification flag is set to one), the update timing information generating unit 610 generates update timing information indicating the timing at which the seed information s and the user key ku are to be updated.

The update timing information includes, as an example, start information designating the timing at which the update is started, and completion information designating the timing at which the update is completed. In this example, the start information indicates the time at which the update is started, and the completion information indicates the time at which the update is completed. Instead of these examples, the start information and the completion information may indicate the number of times by which specific information is exchanged between the measurement apparatus 30 and the service providing apparatus 50, or a value received from the measurement apparatus 30 or an external device to which the service providing apparatus 50 can be connected.

It is also possible for any one or both of the start information and the completion information to be generated by each of the measurement apparatus 30 and the service providing apparatus 50 in such a manner that the measurement apparatus 30 and the service providing apparatus 50 can share the same value. In such a case, the management apparatus 20 generates information required for each of these apparatuses to generate the start information and the completion information, as update timing information. For example, the measurement apparatus 30 and the service providing apparatus 50 may store therein a difference time required in generating completion information with respect to start information in advance, as a fixed value, and the first updating controlling unit 220 may generate only start information as the update timing information.

The start information is information designating future timing with respect to now. For example, the start information indicates future time with respect to current time. The completion information is information designating future timing with respect to the start information. When the start information is indicated as time, the completion information indicates future time with respect to the start information. The completion information may also indicate a difference time with respect to the start information.

The update timing information generating unit 610 may also acquire tie update timing information from the service providing apparatus 50 or another external device, for example. The update timing information generating unit 610 may also generate update timing information using a value stored in advance.

The update timing information generating unit 610 passes the generated update timing information to the seed transmitting unit 213 and the user secret information transmitting unit 219. The seed transmitting unit 218 transmits the update timing information, in addition to the updated seed information s, to the measurement apparatus 30. The user secret information transmitting unit 219, too, transmits the update timing information, in addition to the updated user key ku and user key identifier UKID, to the service providing apparatus 50.

The seed receiving unit 311 in the measurement apparatus 30 receives the update timing information as well as the seed information s from the management apparatus 20. The second updating controlling unit 321 then determines whether it has become necessary to update the user key ku by referring to the start information included in the update timing information received by the seed receiving unit 311. For example, the second updating controlling unit 321 compares the current time with the start time specified in the start information, and, if the current time is after the start time, determines that it has become necessary to update the user key ku, and sets the value of the update notification flag to one.

If the second updating controlling unit 321 determines that it has become necessary to update the user key ku (if the value of the update notification flag is set to one), the second updating unit 322 calls the second key generating unit 313 and the second key identifier generating unit 314, and causes the second key generating unit 313 and the second key identifier generating unit 314 to update the user key ku and the user key identifier UKID, respectively. The second updating unit 322 may also check, as required, whether the current timing is before the deadline for completing the update, by referring to the completion information included in the update timing information received by the seed receiving unit 311. For example, the second updating unit 322 may check whether the current time is before the completion time specified in the completion information. If the current timing is not before the deadline for completing the update, the second updating unit 322 may then stop the updating process, and notify the management apparatus 20 that the update of the user key ku has failed. Alternatively, the measurement apparatus 30 may allow the service providing apparatus 50 to detect an update failure in the measurement apparatus 30 without issuing any completion acknowledgement or failure notification.

The user secret information receiving unit 511 in the service providing apparatus 50 receives the update timing information, as well as the user key ku and the user key identifier UKID, from the management apparatus 20. The key enabling controlling unit 513 then determines whether it has become necessary to update the user key ku by referring to the start information included in the update timing information received by the user secret information receiving unit 511. For example, the key enabling controlling unit 513 compares the current time with the start time specified in the start information, and, if the current time is after the tart time, determines that it has become necessary to update the user key ku, and sets the value of the update notification flag to one.

If the key enabling controlling unit 513 determines that it has become necessary to update the user key ku (if the value of the update notification flag is set to one), the key enabling unit 514 calls the update information appending unit 515, and causes the user key ku and the user key identifier UKID that are appended with an update-related flag to be updated. The key enabling controlling unit 513 also checks whether the current timing is before the deadline for completing the update by referring to the completion information included in the update timing information received by the user secret information receiving unit 511. For example, the key enabling unit 514 checks whether the current time is before the completion time specified in the completion information. If the current timing is not before the deadline for completing the update, the key enabling unit 514 may stop the updating process, and notify the management apparatus 20 that the update of the user key ku has failed.

The key disabling controlling unit 521 determines whether it has become necessary to delete the user key ku having remained unused by referring to the completion information included in the update timing information received by the user secret information receiving unit 511. For example, the key disabling controlling unit 521 compares the current time with completion time specified in the completion information, and, if the current time is after the completion time, determines that it has become necessary to delete the user key ku having remained unused.

The key disabling controlling unit 521 may also be provided with a mechanism for detecting an update failure in the measurement apparatus 30 using the update timing information. For example, the validating unit 515 may be configured to append a usage flag to the user key ku, and, if the usage flag-0 for a user key ku, and the current timing is after the deadline by which the update is completed, the key disabling controlling unit 521 may determine that the update of the user key of the measurement apparatus 30 has failed, and notify the management apparatus 20 of the failure of the update.

To perform the process of deleting the user key ku and the user key identifier UKID, and the process of deleting the sequence number j having already been used, the key disabling unit 522 checks whether the current timing is before the deadline for completing the update by referring to the completion information included in the update timing information received by the user secret information receiving unit 511. If the current timing is after the deadline by which the update is completed, the key disabling unit 522 then executes the deletion process.

Instead of determining whether the usage flag-1, the key disabling unit 522 may also determine whether the current timing is after the deadline by which the update is completed. The key disabling unit 522 may also use the update timing instead of the order information. When the key disabling unit 522 does not use the usage flag or the order information, the update information appending unit 515 may omit appending these pieces of information.

With the transfer system 10 according to the modification of the first embodiment described above, the measurement apparatus 30 and the service providing apparatus 50 may be caused to update the user key ku and the like, at the timing that is different from the timing at which the seed information s, the user key ku, and the user key identifier UKID are transferred. In this manner, with the transfer system 10, the update timing of the measurement apparatus 30 can be matched with the update timing of the service providing apparatus 50.

Second Embodiment

A second embodiment of the present invention will now be explained. Because the second embodiment has substantially the same functions and configuration as the transfer system 10 according to the first embodiment explained with reference to FIGS. 1 to 13, substantially the same elements will be given the same reference signs, and detailed explanations thereof, except for the difference, will be omitted.

In the first embodiment, every time the user key ku is updated, a new user key identifier UKID for identifying the user key ku also generated. In the second embodiment, user identification information UID whose value remains the same even when the user key ku is updated is used instead of the user key identifier UKID. A value that is different for each user is assigned to the user identification information UID. The service providing apparatus 50 stores therein the user identification information UID.

Figure 14:
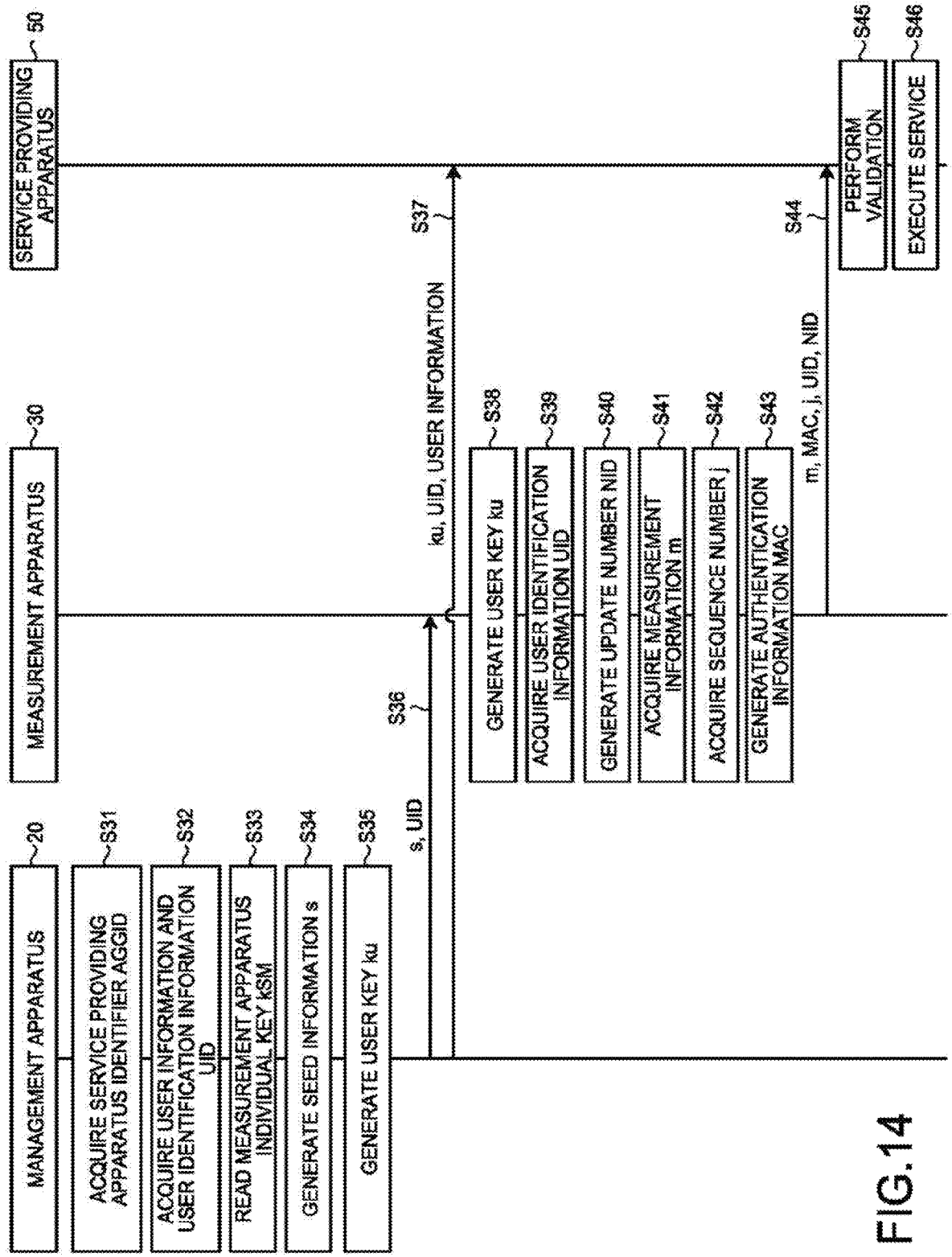
FIG. 14 is a schematic diagram illustrating the sequence of a process in a transfer system according to a second embodiment of the present invention.

FIG. 14 is a schematic diagram illustrating a sequence in which the information is transferred in transfer system 10 according to the second embodiment.

To begin with, the management apparatus 20 acquires the service providing apparatus identifier AGGID of the service providing apparatus 50 that provides the information processing service (Step S31). The management apparatus 20 then acquires the user information and the user identification information UID of the user to whom the service providing apparatus 50 provides the information processing service (Step S32). The management apparatus 20 then reads the measurement apparatus individual key kSM that is associated with the acquired user information (Step S33).

The management apparatus 20 then generates the seed information s from the acquired service providing apparatus identifier AGGID and the random number r (Step S34). The management apparatus 20 then generates the user key ku from the measurement apparatus individual key kSM and the seed information s (Step S35). In the embodiment, the management apparatus 20 does not generate a user key identifier UKID.

The management apparatus 20 then transmits the seed information s and the user identification information UID to the corresponding measurement apparatus 30 via the company network 60 (Step S36). When this process is performed for a plurality of measurement apparatuses 30 in parallel, the management apparatus 20 may transmit the same seed information s and the user identification information UID to all of the measurement apparatuses 30 at once via multicasting, for example.

The management apparatus 20 then transmits the user key ku, the user identification information UID, and the user information to the corresponding service providing apparatus 50 via the communication apparatus 40 and the public network 70 (Step S37). In this case, the management apparatus 20 transmits the user key ku and the user information to the service providing apparatus 50 in a manner concealed from any third parties using an encrypted communication, for example.

The measurement apparatus 30 then generates the user key ku from the measurement apparatus individual key kSM stored therein, and the seed information s received from the management apparatus 20 (Step S38). In the embodiment, the measurement apparatus 30 does hot generate a user key identifier UKID.

The measurement apparatus 30 then acquires the user identification information UID received together with the seed information s (Step S39). The measurement apparatus 30 then generates an update number NID for the user key ku (Step S40). The update number NID is a value for identifying the number of times by which the user key ku corresponding to each piece of the user identification information UID is updated. For example, the update number NID is a value incremented or decremented from a predetermined initial value by a predetermined count (such as one) every time the user key ku is updated.

The measurement apparatus 30 then acquires the measurement information m (Step S41). The measurement apparatus 30 then acquires the sequence number j (Step S42). The measurement apparatus 30 then generates authentication information MAC authenticating the legitimacy of the measurement information m, based on the measurement information m, the user key ku, and the sequence number j (Step S43).

The measurement apparatus 30 then transmits the measurement information m, the authentication information MAC, the sequence number j, the user identification information UID, and the update number NID to the corresponding service providing apparatus 50 via the communication apparatus 40 and the public network 70 (Step S44).

The service providing apparatus 50 then validates the legitimacy of the measurement information m based on the user key ku received from the management apparatus 20, and the measurement information m, the sequence number j, and the authentication information MAC received from the measurement apparatus 30 (Step S45). The service providing apparatus 50 then performs an information processing service using the measurement information m having been determined to be legitimate (Step S46).

Figure 15:
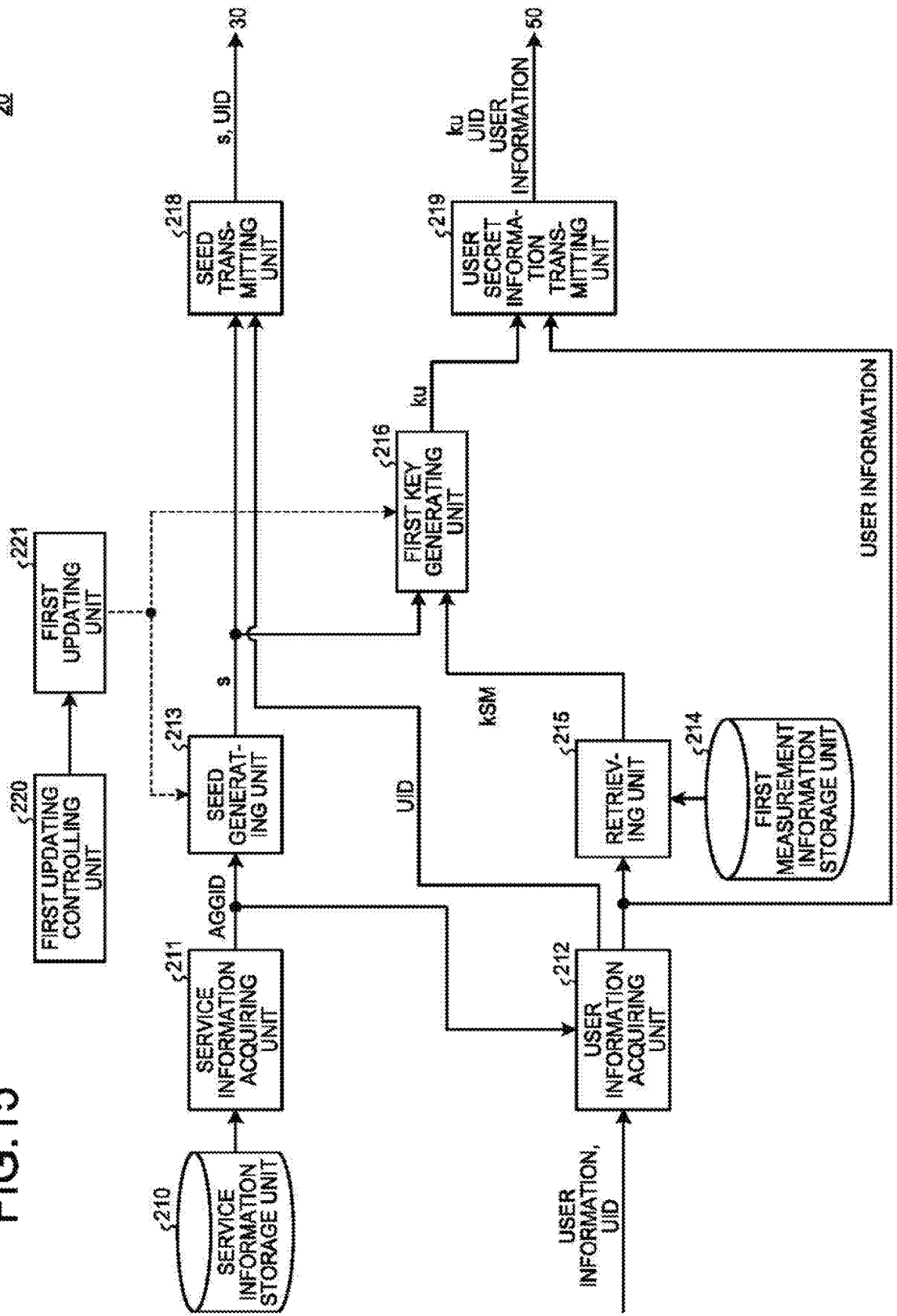
FIG. 15 is a schematic diagram of a configuration of a management apparatus according to the second embodiment.

FIG. 15 is a schematic diagram illustrating a configuration of the management apparatus 20 according to the second embodiment. The management apparatus 20 according to the second embodiment does not have the first key identifier generating unit 217, compared with the management apparatus 20 according to the first embodiment illustrated in FIG. 4.

The user information acquiring unit 212 acquires the user information and the user identification information. UID of a user to whom the service is provided. The user information acquiring unit 212 then passes the acquired user identification information UID to the seed transmitting unit 218. The user identification information UID may be generated by the management apparatus 20, instead of being generated by the user information acquiring unit 212.

The retrieving unit 215 reads the measurement apparatus individual key kSM paired with the received user information from the first measurement information storage unit 214. The retrieving unit 215 does not read the measurement apparatus identifier SMID from the first measurement information storage unit 214.

The seed transmitting unit 218 transmits the seed information s generated by the seed generating unit 213, and the user identification information UID acquired by the user information acquiring unit 212 to the measurement apparatuses 30 via the company network 60. The user secret information transmitting unit 219 transmits the user key ku generated by the first key generating unit 216, the user identification information UID acquired by the user information acquiring unit 212, and the corresponding user information to the corresponding service providing apparatus 50 via the public network 70. When the service providing apparatus 50 is capable of acquiring the user identification information UID using the user information, the user secret information transmitting unit 219 does not need to transmit the user identification information UID. The user secret information transmitting unit 210 does not transmit the user key identifier UKID.

Figure 16:
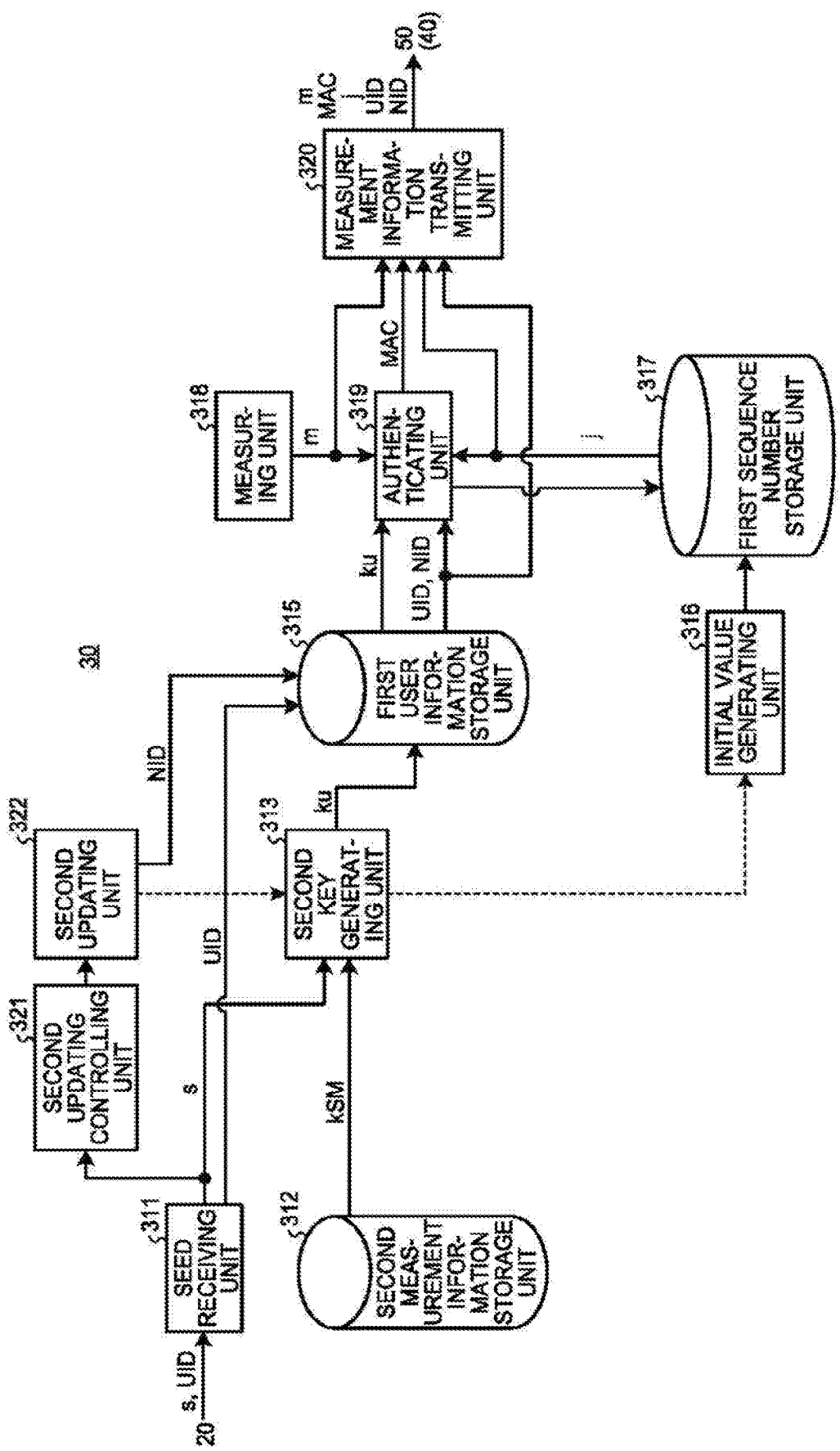
FIG. 16 is a schematic diagram of a configuration of measurement apparatus according to the second embodiment.

FIG. 16 is a schematic diagram illustrating a configuration of the measurement apparatus 30 according to the second embodiment. The measurement apparatus 30 according to the second embodiment does not include the second key identifier generating unit 314, compared with the measurement apparatus 30 according to the first embodiment illustrated in FIG. 5.

The seed receiving unit 311 receives the seed information s and the user identification information DID from the management apparatus 20 via the company network 60. When the second updating unit 322 calls the second key generating unit 313 to update the user key ku, the second updating unit 322 generates an update number NID indicating the number of times the user key ku to be updated is updated. The first user information storage unit 315 stores therein the user key ku generated by the second key generating unit 313, and the update number NID of the user key ku, in a manner associated with the user identification information UID received by the seed receiving unit 311. In the embodiment, the first user information storage unit 315 does not store therein the user key identifier UKID.

The authenticating unit 319 generates the authentication information MAC authenticating the legitimacy of the measurement information m using the measurement information m acquired by the measuring unit 318, the user key ku stored in the first user information storage unit 315, and the sequence number j stored in first sequence number storage unit 317. The measurement information transmitting unit 320 passes the measurement information m, the authentication information MAC, the sequence number j, the user identification information UID, and the update number NID to the communication apparatus 40. The communication apparatus 40 transmits the measurement information m received from the measurement apparatus 30, the authentication information MAC, the sequence number j, the user identification information UID, and the update number NID to the service providing apparatus 50 via the public network 70. The authenticating unit 319 may determine whether to transmit the update number NID depending on the update status of the user key ku. For example, the communication apparatus 40 may transmit the update number NID when the authenticating unit 319 executes the process for the first time after the user key ku is updated, and may not transmit the update number NID in the cases other than that.

The service providing apparatus 50 according to the second embodiment has the same configuration as the service providing apparatus 50 according to the first embodiment illustrated in FIG. 6.

The user secret information receiving unit 511 receives the user identification information UID, instead of the user key identifier UKID, in addition to the user information and the user key ku. The user secret information receiving unit 511 may retrieve the user identification information UID from the user information, instead of receiving the user identification information UID. The update information appending unit 515 writes the user key ku and the user identification information UID to the second user information storage unit 512, in a manner associated with the user. The second user information storage unit 512 stores therein, for each user, the user information, the user key ku, and the user identification information UID in a manner associated with one another. In the second embodiment, the second user information storage unit 512 does not store therein the order information (time information).

The measurement information receiving unit 6 receives the measurement information m, the authentication information MAC, the sequence number j, the user identification information UID, and the update number NID from the measurement apparatus 30 via the communication apparatus 40 and the public network 70. The second sequence number storage unit 517 stores therein, for each of the user identification information UID and update number NID, all of the sequence numbers j received by the measurement information receiving unit 516.

The validating unit 518 acquires the user key ku with the user identification information UID and the update number NID matching with each other received from the second user information storage unit 512. If the validating unit 518 cannot acquire the user key ku with a matching update number NID, the validating unit 518 acquires the user keys ku rot appended with the update number NID one by one, and repeats the validation process until the received measurement information m is determined to be legitimate with some user key ku, or until the received measurement information m is determined not to be legitimate with all of the user keys ku. The validating unit 518 then generates the validating authentication information MAC' following the same process as that followed by the authenticating unit 319 in the measurement apparatus 30, using the acquired user key ku, the measurement information m received by the measurement information receiving unit 516, and the sequence number j received by the measurement information receiving unit 516. The validating unit 518 then compares the generated validating authentication information with the authentication information MAC received from the measurement apparatus 30, and, if these pieces of information do not match, determines that the measurement information m is not legitimate.

When these pieces of information match, the validating unit 518 further determines whether the sequence number j received by the measurement information receiving unit 516 is stored in the second sequence number storage unit 517 in a manner associated with the user identification information UID and the update number NID received by the measurement information receiving unit 516. If the received sequence number j is stored in a manner associated with the received user identification information UID and update number NID, the validating unit 518 determines that the measurement information m is not legitimate.

If the validating authentication information MAC' and the received authentication information MAC match, and the received sequence number j is not stored in a manner associated with the received user identification information UID and update number NID, the validating unit 518 determines that the received measurement information m is legitimate.

If the received measurement information m has been determined to be legitimate, the validating unit 518 then stores the received sequence number j in the second sequence number storage unit 517 in a manner associated with the received user identification information UID and update number NID. If the validating unit 518 determines that the received measurement information m is legitimate, and the user key ku used in the validation is not appended with an update number, the validating unit 518 appends the update number NIP received by the measurement information receiving unit 516 to the user key ku.

Figure 17:
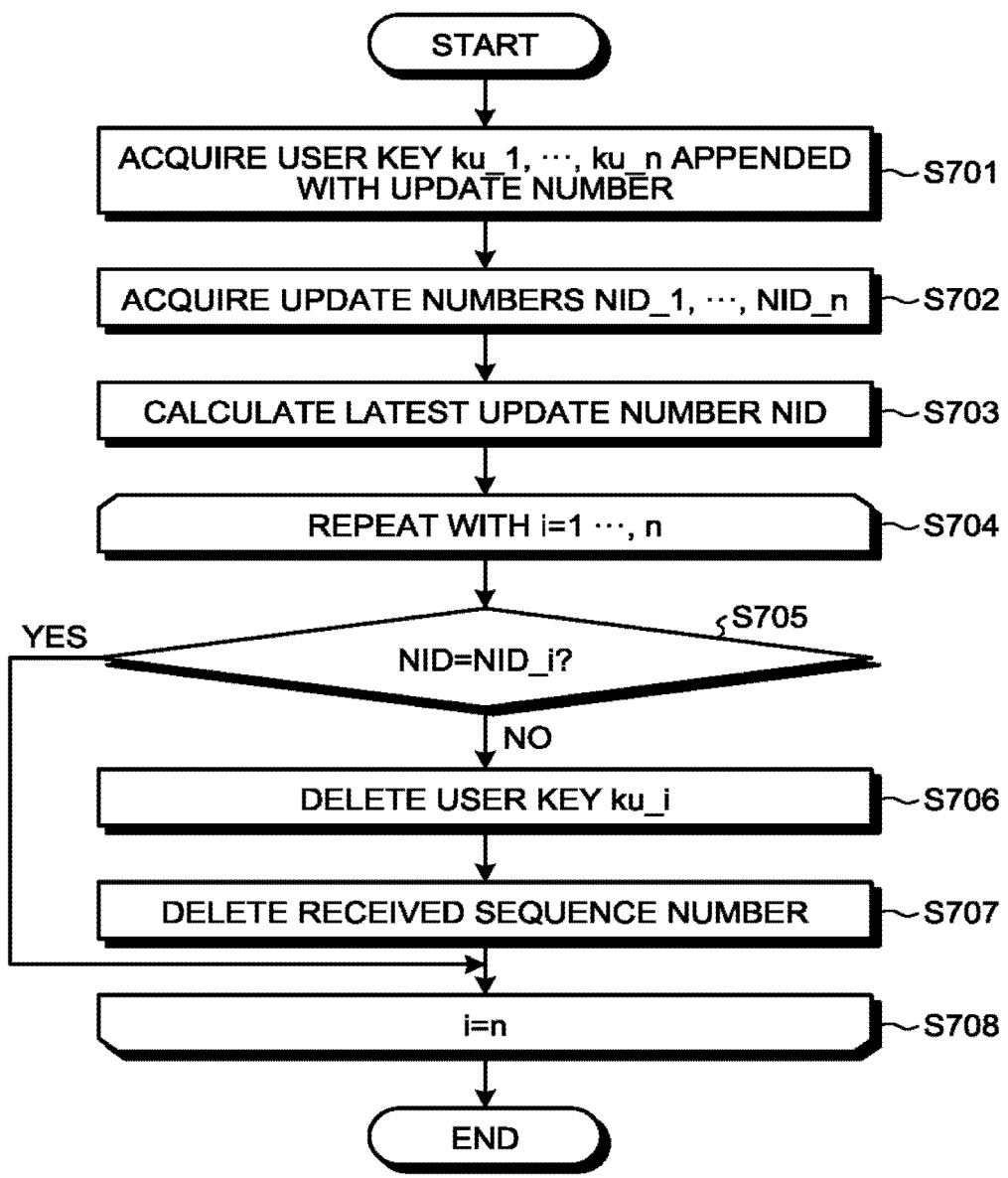
FIG. 17 is a flowchart of a key disabling process according to the second embodiment.

FIG. 17 is a flowchart of a key disabling process performed in the service providing apparatus 50 according to the second embodiment. To disable a key such as a user key ku used before an update, the service providing apparatus 50 according to the second embodiment executes the process at Step S701 to Step S708 in FIG. 17.

To begin with, the key disabling unit 522 acquires all of the user key ku_1, . . . , ku_n appended with the update number NID, for each piece of user identification information UID stored in the second user information storage unit 512 (Step S701). The key disabling unit 522 then acquires the update numbers NID_1, . . . , NID_n for the respective acquired user keys ku_1, ku_n (Step S702). The key disabling unit 522 then calculates the latest update number NID, from the acquired update numbers HID_1, . . . , NID_n (Step S703).

The key disabling unit 522 then increments i by one from one, and repeats the process at Step S705 to Step S707 until i becomes equal to n (loops between Step S704 and Step S708). At Step S705 within the loop, the key disabling unit 522 determines whether the latest update number NID and the update number NID_i match. If these numbers match (Yes at Step S705), the key disabling unit 522 sets i to the next value, without performing the processes at Step S706 and Step S707. If these numbers do not match (No at Step S705), at Step S706, the key disabling unit 522 deletes the user key ku_i from the second user information storage unit 512. At Step S707, the key disabling unit 522 then deletes every sequence number having already been received and associated with the update number NID from the second sequence number storage unit 517.

As described above, with the transfer system 10 according to the second embodiment, the measurement information m acquired by the measurement apparatus 30 can be transmitted to the service providing apparatus 50 securely and easily, in the same manner as in the first embodiment. Furthermore, because the transfer system 10 according to the second embodiment does not need to update the user key identifier UKID, the cost of the updating process can be reduced.

In the transfer system 10 according to the second embodiment as well, the update timing information can be generated so that the measurement apparatus 30 and the service providing apparatus 50 can be caused to update the user key ku at the designated timing, in the same manner as in the modification of the first embodiment.

Furthermore, in the embodiment, the measurement apparatus 30 transmits the update number NID, and the service providing apparatus 50 executes the updating process based on the update number. Instead of such a configuration, the measurement apparatus 30 may transmit a flag indicating an update to the service providing apparatus 50, and the service providing apparatus 50 may correct the update number NID stored in the service providing apparatus 50 using the received flag indicating the update, and perform the updating process based on the corrected update number NID.

Third Embodiment

A third embodiment of the present invention will now be explained. Because the third embodiment has substantially the same functions and configuration as the transfer system 10 according to the first embodiment explained with reference to FIGS. 1 to 13, substantially the same elements will be given the same reference signs, and detailed explanations thereof, except for the difference, will be omitted.

In the third embodiment, the updating of the user key ku and the user key identifier UKID is executed using one of two methods of a first method and a second method. The first method is the same method as that performed in the first embodiment. The second method is a method for generating an updated user key ku using the user key ku immediately before the update (current user key ku). The same type of process is performed for the user key identifier UKID.

Furthermore, when the updates are made using the second method, the management apparatus 20 transmits updated seed information s to the service providing apparatus 50, without transmitting the updated user key ku and the updated user key identifier UKID to the service providing apparatus 50. In this manner, the management apparatus 20 does not need to transmit the user key ku and the user key identifier UKID of each of the measurement apparatuses 30 to the service providing apparatus 50, and therefore, the communication load during the update can be reduced.

Figure 18:
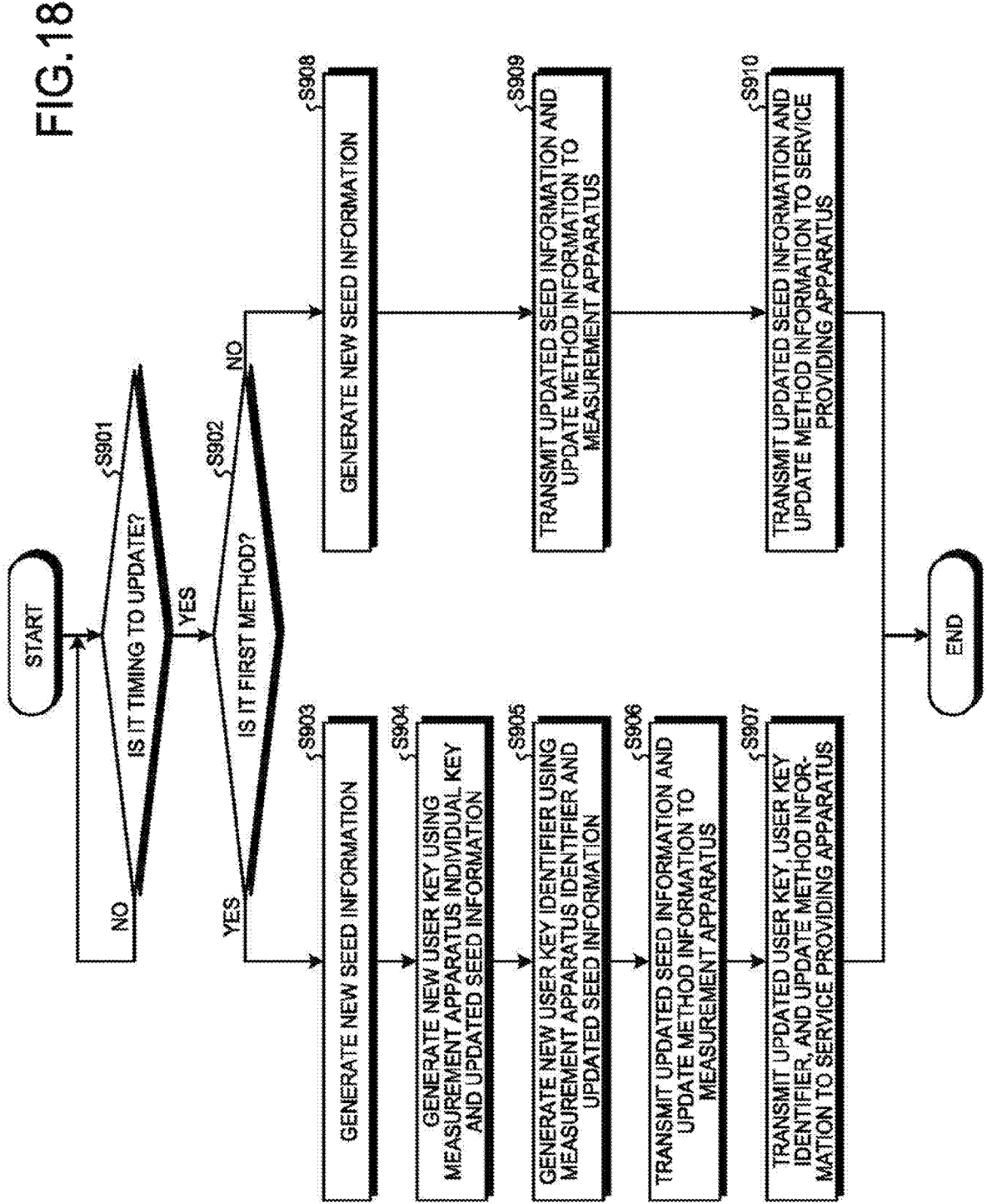
FIG. 18 is a flowchart of an updating process according to a third embodiment of the present invention.

FIG. 18 is a flowchart of an updating process performed in the management apparatus 20 according to the third embodiment. When the user key ku is to be updated, the management apparatus 20 according to the third embodiment executes the process at Step S901 to Step S910 in FIG. 18.

To begin with, at Step S901, the first updating controlling unit 220 determines whether it is the timing to update the user key ku. If it is not the timing to update the user key ku (No at S901), the first updating controlling unit 220 notifies the first updating unit 221 that it is not the timing for updating (for example, by outputting an update notification flag with a value zero), and keeps the process waiting at Step S901. If it is the timing for updating (Yes at S901), the first updating controlling unit 220 shifts the process to Step S902.

At Step S902, the first updating controlling unit 220 determines whether it is a timing for making an update using the first method or a timing for making an update using the second method. For example, when there has been a possible leakage of the user key (for example, when disabling of the user key ku is requested, or when the measurement apparatus individual key kSM is updated), it is appropriate to make the update without using the user key ku before the update (old key), and therefore, the first updating controlling unit 220 determines that it is a timing for making an update using the first method. If it is not the update timing for using the first method, the first updating controlling unit 220 determines that it is a timing for making an update using the second method. The first updating controlling unit 220 may determine that it is a timing for making an update using the second method, for example, when the sequence number j for the authentication information MAC generated in the measurement apparatus 30 is expected to overflow, or when the timing is immediately before the expiration of a preset valid period of the user key ku.

If it is the update timing for using the first method (Yes at Step S902), the first updating controlling unit 220 notifies the first updating unit 221 that it is the update timing for using the first method (for example, by outputting the update notification flag with a value set to one), and shifts the process to Step S903. If it is a timing for making an update using the second method (No at Step S902), the first updating controlling unit 220 notifies the first updating unit 221 that it is a timing for making an update using the second method (for example, by outputting the update notification flag with a value set to two), and shifts the process to Step S908.

Upon receiving the notification that it is a timing for making an update using the first method, at Step S903, the first updating unit 221 calls the seed generating unit 213, and causes the seed generating unit 213 to generate new seed information s. Specifically, the first updating unit 221 generates new seed information s, by performing the operation of H1(AGGID, r), using the service providing apparatus identifier AGGID and the new random number r.

At Step S904, the first updating unit 221 calls the first key generating unit 216, and causes the first key generating unit 216 to generate a new user key ku using the first method. Specifically, the first key generating unit 216 generates a new user key ku by performing the operation of H2(kSM, s), using the measurement apparatus individual key kSM and the new seed information s.

At Step S905, the first updating unit 221 then calls the first key identifier generating unit 217, and causes the first key identifier generating unit 217 to generate a new user key identifier UKID using the first method. Specifically, the first key generating unit 216 generates a new user key identifier UKID by performing the operation of H3(SMID, s), using the measurement apparatus identifier SMID and the new seed information.

At Step S906, the seed transmitting unit 218 then transmits the updated new, seed information s, and a piece of update method information indicating that the update has been made using the first method to the measurement apparatuses 30. At Step S907, the user secret information transmitting unit 219 then transmits the updated new user key ku, the new user key identifier UKID, and the update method information to the service providing apparatus 50.

Upon receiving the notification of a timing for making an update using the second method at Step S908, the first updating unit 221 calls the seed generating unit 213, and causes the seed generating unit 213 to generate new seed information s. Specifically, the first updating unit 221 generates new seed information s by performing the operation of H1(AGGID, r), using the service providing apparatus identifier AGGID and the new random number r.

At Step S909, the seed transmitting unit 218 then transmits the updated new seed information s, and the update method information indicating that the update has been made using second method to the measurement apparatuses 30.

At Step S910, the user secret information transmitting unit 219 transmits the updated new seed information s and the update method information to the service providing apparatus 50. When updated are the user keys ku of a plurality of respective measurement apparatuses 30, the user secret information transmitting unit 219 may transmits the same seed information s to the measurement apparatuses 30 at once.

Figure 19:
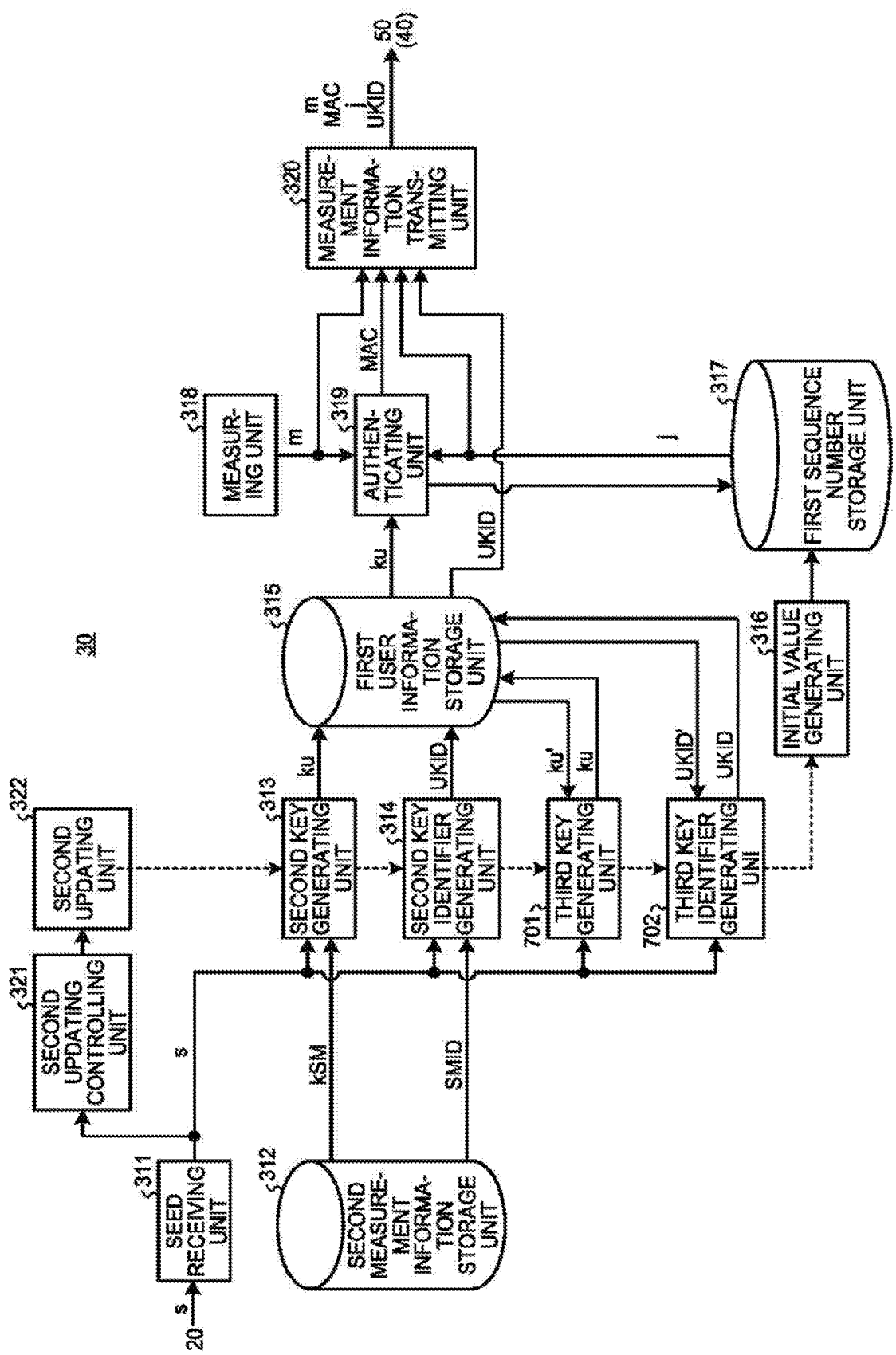
FIG. 19 is a schematic diagram of a configuration of a measurement apparatus according to the third embodiment.

FIG. 19 is a schematic diagram illustrating a configuration of the measurement apparatus 30 according to the third embodiment. The measurement apparatus 30 according to the third embodiment further includes a third key generating unit 701 and a third key identifier generating unit 702, in addition to the configuration of the measurement apparatus 30 according to the first embodiment illustrated in FIG. 5.

The seed receiving unit 311 also receives the update method information from the management apparatus 20. The second updating controlling unit 521 determines whether to make an update using the first method or the second method, or not to make an update by referring to the update method information. When an update is to be made using the first method based on the determination of the second updating controlling unit 321, the second updating unit 322 calls the second key generating unit 313 and the second key identifier generating unit 314, and updates the user key ku and the user key identifier UKID following the same method as that according to the first embodiment. When an update is to be made using the second method, the second updating unit 322 calls the third key generating unit 701 and the third key identifier generating unit 702.

The third key generating unit 701 is called when the second updating unit 322 is to make an update using the second method. Upon being called by the second updating unit 322, the third key generating unit 701 generates a new user key ku using the second method. Specifically, the third key generating unit 701 generates a new user key ku following the operation indicated as Equation (5) below, using the current user key ku' stored in the first user information storage unit 315, and the new seed information s.

$$ku = H5(ku', s) \tag{5}$$

The function H5(x, y) is a function that generates one value by receiving x and y as inputs. The function H5(x, y) may be a unidirectional function receiving x and y as input values. Examples of the unidirectional function include sha-1, md5, sha256, and shad-256. The function H5(x, y) may be a keyed-hash function receiving x as a key, and y as a message. Examples of the keyed-hash function include hmac and omac.

The third key identifier generating unit 702 is called when the second updating unit 322 is to make an update using the second method. Upon being called by the second updating unit 322, the third key identifier generating unit 702 generates a new user key identifier UKID using the second method. Specifically, the third key identifier generating unit 702 generates a new user key identifier UKID following the operation indicated as Equation (6) below, using the current user key identifier UKID' stored in the first user information storage unit 315 and the new seed information s.

$$UKID = H6(UKID', s) \tag{6}$$

The function H6(x, y) is a function that generates one value by receiving x and y as inputs. The function H6(x, y) may be a unidirectional function receiving x and y as input values. Examples of the unidirectional function include sha-1, md5, sha256, and sha3-256. The function H6(x, y) may be a keyed-hash function receiving x as a key, and y as a message. Examples of the keyed-hash function include hmac and omac.

Figure 20:
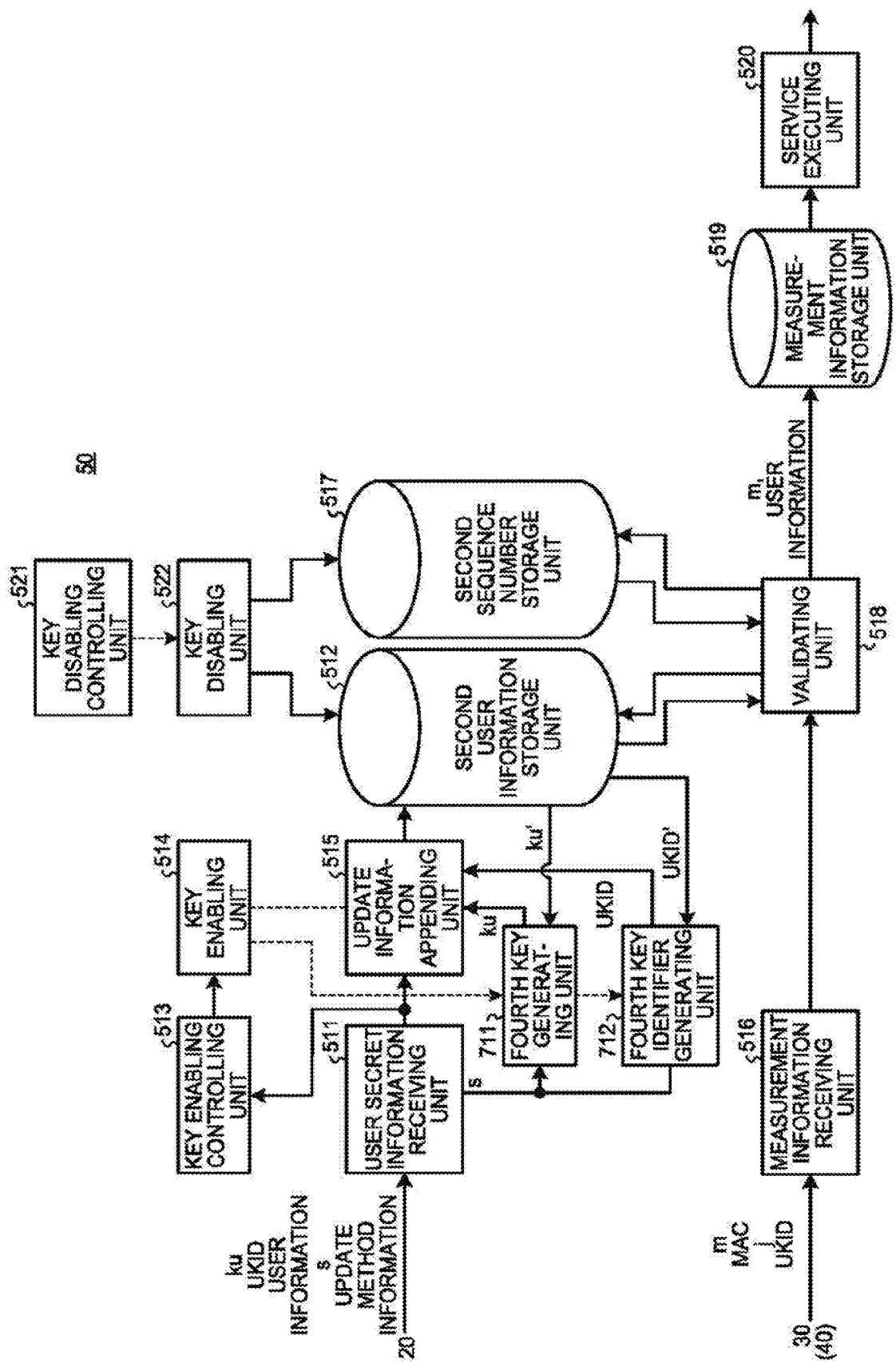
FIG. 20 is a schematic diagram f a configuration of a service providing apparatus according to the third embodiment.

FIG. 20 is a schematic diagram illustrating a configuration of the service providing apparatus 50 according to the third embodiment. The service providing apparatus 50 according to the third embodiment further includes a fourth key generating unit 711 and a fourth key identifier generating unit 712, in addition to the configuration of the service providing apparatus 50 according to the first embodiment illustrated in FIG. 6.

The user secret information receiving unit 511 also receives the seed information s and the update method information from the management apparatus 20. The key enabling unit 514 determines the update method by referring to the update method information. When an update is to be made using the first method, the key enabling unit 514 updates the user key ku and the user key identifier UKID following the same method as that according to the first embodiment. When an update is to be made using the second method, the key enabling unit 514 calls the fourth key generating unit 711 and the fourth key identifier generating unit 712.

The fourth key generating unit 711 generates a new user key ku using the current user key ku' stored in the second user information storage unit 512 and the seed information s received by the user secret information receiving unit 511. The fourth key generating unit 711 generates the user key ku using a method with which the same result as that output from the third key generating unit 701 in the measurement apparatus 30 can be acquired.

The fourth key identifier generating unit 712 generates a new user key identifier UKID using the current user key identifier UKID' stored in the second user information storage unit 512, and the seed information s received by the user secret information receiving unit 511. The fourth key identifier generating unit 712 generates the user key identifier UKID using a method with which the same result as that output from the third key identifier generating unit 702 in the measurement apparatus 30 is acquired.

Figure 21:
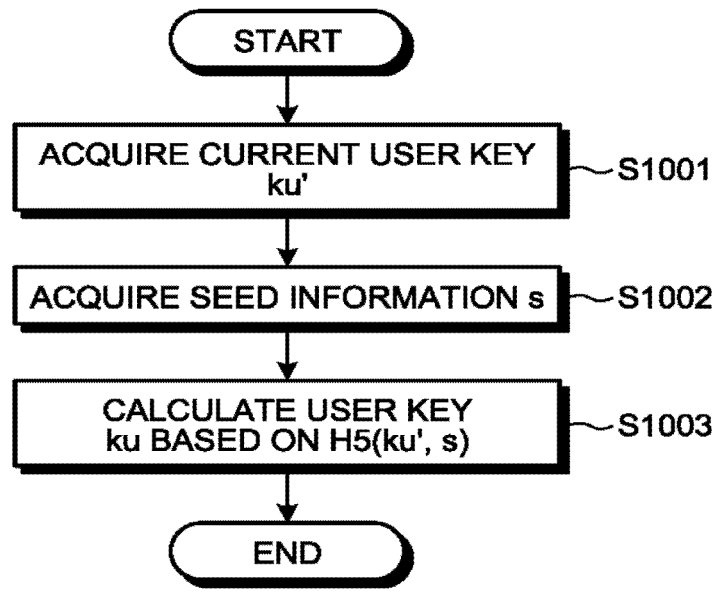
FIG. 21 is a flowchart of a generation of a user key in a second method.

FIG. 21 is a flowchart of a generation of a user key ku using the second method in the third embodiment. The measurement apparatus 30 and the service providing apparatus 50 according to the third embodiment determine whether to make an update using the first method and the second method based on the update method information received from the management apparatus 20. When the first method is to be used to update the user key ku, the same process as that illustrated in FIG. 8 is performed. When the second method is to be used to update the user key ku, the process illustrated in FIG. 21 is performed.

To begin with, a process of generating a user key ku in the measurement apparatus 30 will be explained. The third key generating unit 701 acquires the current user key ku' from the first user information storage unit 315 (Step S1001). The third key generating unit 701 then acquires the new seed information s received by the seed receiving unit 311 (Step S1002). The third key generating unit 701 then generates a new user key ku by performing the operation of H5(ku', s), using the current user key ku' and the seed information (Step S1003). The third key generating unit 701 then stores the generated new user key ku in the first user information storage unit 315.

A process of generating a user key ku in the service providing apparatus 50 will now be explained. The fourth key generating unit 711 acquires the current user key ku' from the second user information storage unit 512 (Step S1001). The fourth key generating unit 711 then acquires the new seed information s received by the user secret information receiving unit 511 (Step S1002). The fourth key generating unit 711 then generates a new user key ku by performing the operation of H5(ku', s), using the current user key ku' and the seed information s (Step S1003). The fourth key generating unit 711 then stores the generated new user key ku in the second user information storage unit 512.

Figure 22:
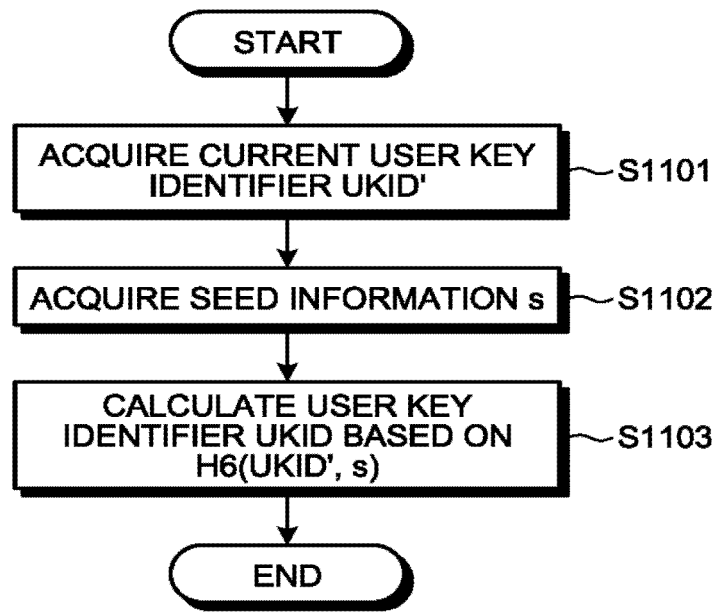
FIG. 22 is a flowchart of a generation of a user key identifier in the second method.

FIG. 22 is a flowchart of a generation of a user key identifier UKID using the second method in the third embodiment. The measurement apparatus 30 and the service providing apparatus 50 according to the third embodiment determine whether to make an update using the first method or using the second method based on the update method information received from the management apparatus 20. When the user key identifier UKID is to be updated using the first method, the same process as that illustrated in FIG. 9 is performed. When the user key identifier UKID is to be updated using the second method, the process illustrated in FIG. 22 is performed.

To begin with, the process of generating a user key identifier UKID in the measurement apparatus 30 will be explained. The third key identifier generating unit 702 acquires the rent user key identifier UKID' from the first user information storage unit 15 (Step S1101). The third key identifier generating unit 702 then acquires the new seed information s received by the seed receiving unit 311 (Step S1102). The third key identifier generating unit 702 then generates a new user key identifier UKID by performing the operation of H6(UKID', s), using the current user key identifier UKID' and the seed information s (Step S1103). The third key identifier generating unit 702 then stores the generated new user key identifier UKID in the first user information storage unit 31.

The process of generating a user key identifier UKID in the service providing apparatus 50 will now be explained. The fourth key identifier generating unit 712 acquires the current user key identifier UKID' from the second user information storage unit 51 (Step S1101). The fourth key identifier generating unit 712 then acquires the new seed information s received by the user secret information receiving unit 511 (Step S1102). The fourth key identifier generating unit 712 then generates a new user key identifier UKID by performing the operation of H6(UKID', s), using the current user key identifier UKID' and the seed information s (Step S1103). The fourth key identifier generating unit 712 then stores the generated new user key identifier UKID in the second user information storage unit 512.

As described above, with the transfer system 10 according to the third embodiment, the measurement information m acquired by the measurement apparatus 30 can be transmitted to the service providing apparatus 50 securely and easily, in the same manner as in the first embodiment. Furthermore, the transfer system 10 according to the third embodiment can change the update method depending on the conditions. Furthermore, when an update is to be made using the second method, the management apparatus 20 can merely transmit the seed information s to the service providing apparatus 50, therefore, the communication load can be reduced.

It is also possible for the transfer system 10 according to the third embodiment, too, to generate the update timing information, and to cause the measurement apparatus 30 and the service providing apparatus 50 to update the user key ku and the user key identifier UKID at the designated timing, in the same manner as in the modification of the first embodiment.

Furthermore, it is also possible for the transfer system 10 according to the third embodiment to use the fixed user identification information LED, instead of the user key identifier UKID, in the same manner as in the second embodiment. In such a case, the measurement apparatus 30 and the service providing apparatus 50 may synchronize the timing of updates using the update number NID generated by the measurement apparatus 30.

Hardware Configuration

Figure 23:
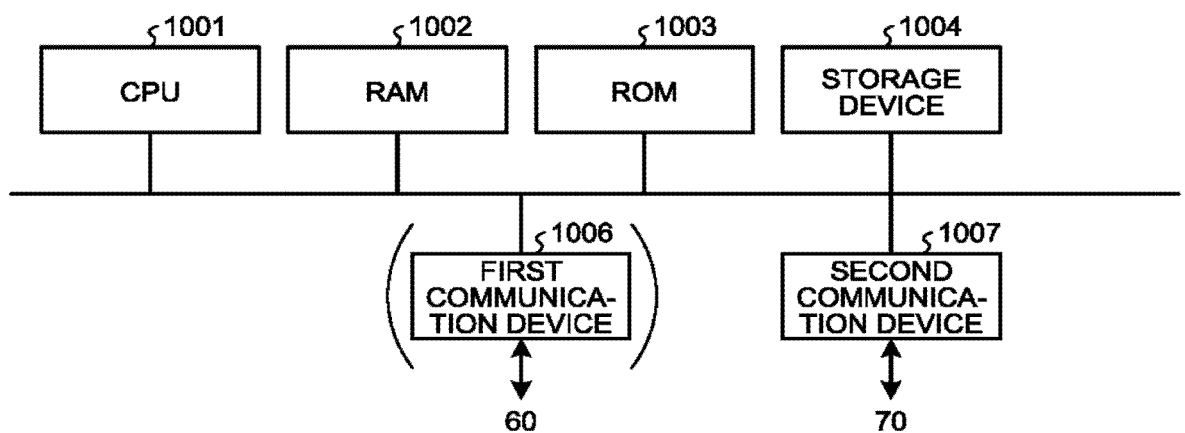
FIG. 23 is a schematic diagram of a hardware configuration of the management apparatus and the service providing apparatus.

FIG. 23 is a schematic diagram illustrating a hardware configuration of the management apparatus 20 and the service providing apparatus 50. The management apparatus 20 and the service providing apparatus 50 according to the embodiments can be implemented as an information processing apparatus having a hardware configuration illustrated in FIG. 23, for example. In the example illustrated in FIG. 23, the management apparatus 20 and the service providing apparatus 50 are implemented as one information processing apparatus, but may also be implemented as a plurality of information processing apparatuses cooperating with one another.

The information processing apparatus includes a central processing unit (CPU) 1001, a random access memory (RAM) 1002, a read-only memory (ROM) 1003, a storage device 1004, a first communication device 1006, and a second communication device 1007. These units are then connected via a bus.

An information processing apparatus implementing the service providing apparatus 50 does not include the first communication device 1006.

The CPU 1001 is a processor that executes processes such as an operating process and a controlling process following a computer program. The CPU 1001 performs various processes by cooperating with a computer program stored in the ROM 1003, the storage device 1004, and the like, using a predetermined area of the RAM 1002 as a working area.

The RAM 1002 is a memory such as a synchronous dynamic random access memory (SDRAM). The RAM 1002 functions as a working area of the CPU 1001. The ROM 1003 is a memory storing therein computer programs and various types of information non-rewritably.

The storage device 1004 is a device with which data is written to and read from a semiconductor storage medium such as a flash memory or a storage medium capable of magnetically or optically recording. The storage device 1004 writes and reads data to and from a storage medium under the control of the CPU 1001.

The first communication device 1006 communicates with external devices via the company network 60 under the control of the CPU 1001. The second communication device 1007 communicates with external devices via the public network 70 under the control of the CPU 1001.

A computer program executed on the management apparatus 20 according to the embodiments h a modular structure including a service information acquiring module, a user information acquiring module, a seed generating module, a retrieving module, a first key generating module, a first key identifier generating module, a seed transmitting module, a user secret information transmitting module, a first update controlling module, and a first updating module. This computer program causes an information processing apparatus to function as the service information acquiring unit 211, the user information acquiring unit 212, the seed generating unit 213, the retrieving unit 215, the first key generating unit 216, the first key identifier generating unit 217, the seed transmitting unit 215, the user secret information transmitting unit 219, the first updating controlling unit 220, and the first updating unit 221, by being loaded onto the RAM 1002 and being executed by the CPU 1001 (processor). This computer program also causes the storage device 1004 to function as the first measurement information storage unit 214.

Without limitation to such a configuration, the management apparatus 20 may include at least a part of the service information acquiring unit 211, the user information acquiring unit 212, the seed generating unit 213, the retrieving unit 215, the first key generating unit 216, the first key identifier generating unit 217, the seed transmitting unit 218, the user secret information transmitting unit 219, the first updating controlling unit 220, and the first updating unit 221 implemented as a hardware circuit (such as a semiconductor integrated circuit).

Furthermore, a computer program executed on the service providing apparatus 50 according to the embodiments has a modular structure including a user secret information receiving module, a key enabling controlling module, a key enabling module, an update information appending module, a measurement information receiving module, a validating module, a service executing module, a key disabling controlling module, and a key disabling module. This computer program causes an information processing apparatus to function as the user secret information receiving unit 511, the key enabling controlling unit 513, the key enabling unit 514, the update information appending unit 515, the measurement information receiving unit 516, the validating unit 518, the service executing unit 520, the key disabling controlling unit 521, and the key disabling unit 522, by being loaded onto the RAM 1002 and being executed by the CPU 1001 (processor). This computer program also causes the storage device 1004 to function as the second user information storage unit 512, the second sequence number storage unit 517, and the measurement information storage unit 519.

Without limitation to such a configuration, the service providing apparatus 50 may include at least a part of the user secret information receiving unit 511, the second user information storage unit 512, the key enabling controlling unit 513, the key enabling unit 514, the measurement information receiving unit 516, the validating unit 518, the service executing unit 520, and the key disabling unit 522 implemented as a hardware circuit (such as a semiconductor integrated circuit).

Figure 24:
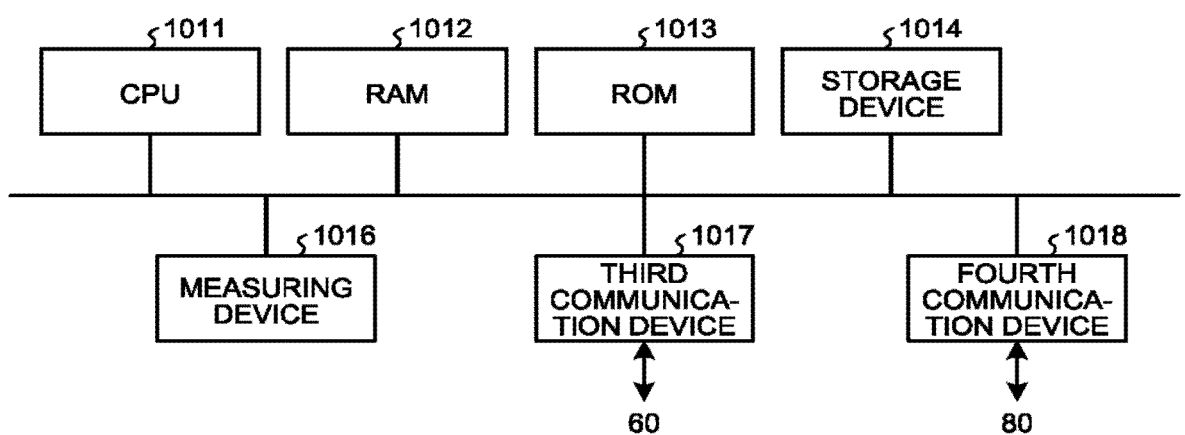
FIG. 24 is a schematic diagram of a hardware configuration of the measurement apparatus.

FIG. 24 is a schematic diagram illustrating a hardware configuration of the measurement apparatus 30. The measurement apparatus 30 according to the embodiments may be implemented as an information processing apparatus having the hardware configuration illustrated in FIG. 24, for example. The information processing apparatus includes a CPU 1011, a RAM 1012, a ROM 1013, a storage device 1014, a measuring device 1016, a third communication device 1017, and a fourth communication device 1018. These units are then connected via a bus.

The CPU 1011 is a processor that executes processes such as an operating process and a controlling process according to a computer program. The CPU 1011 performs various processes by cooperating with a computer program stored in the ROM 1013, the storage device 1014, and the like, using a predetermined area of the RAM 1212 as a working area.

The RAM 1012 is a memory such as an SDRAM. The RAM 1012 functions as a working area of the CPU 1011. The ROM 1013 is a memory storing therein computer programs and various types of information non-rewritably.

The storage device 1014 is a device with which data is written to and read from a semiconductor storage medium such as a flash memory, or a storage medium capable of magnetically or optically recording. The storage device 1014 writes and reads data to and from a storage medium under the control of the CPU 1011.

The measuring device 1016 is a measuring device for measuring an amount of electricity, a gas flow rate, a flow rate of tap water or wastewater, for example. The third communication device 1017 communicates with external devices via the company network 60, under the control of the CPU 1011. The fourth communication device 1018 communicates with external devices via the user network 80, under the control of the CPU 1011.

The measuring device 1016 may be provided external to the measurement apparatus 30, without being provided integrally to the internal of the measurement apparatus 30. Furthermore, the process of generating the authentication information MAC may be executed by a device other than the measuring device 1016. For example, the process may be executed by a concentrator that is a concentration device of the measurement apparatuses 30, or by a head end system temporarily accumulating the amount of electricity usage, for example.

Furthermore, a computer program executed on the measurement apparatus 30 according to the embodiments has a modular structure including a seed receiving module, a second key generating module, a second key identifier generating module, an initial value generating module, a measuring module, a authenticating module, a measurement information transmitting module, a second update controlling module, and a second update module. This computer program causes an information processing apparatus to function as the seed receiving unit 311, the second key generating unit 313, the second key identifier generating unit 314, the initial value generating unit 316, the measuring unit 318, the authenticating unit 319, the measurement information transmitting unit 320, the second updating controlling unit 321, and the second updating unit 322 by being loaded onto the RAM 1012 and being executed by the CPU 1011 (processor). This computer program also causes the storage device 1014 to function as the second measurement information storage unit 312, the first user information storage unit 315, and the first sequence number storage unit 317.

Without limitation to such a configuration, the measurement apparatus 30 may include at least a part of the seed receiving unit 311, the second key generating unit 313, the second key identifier generating unit 314, the initial value generating unit 316, the measuring unit 318, the authenticating unit 319, the measurement information transmitting unit 320, the second updating controlling unit 321, and the second updating unit 322 implemented as a hardware circuit (such as a semiconductor integrated circuit).

Described below is an exemplary usage scenario of the invention according to the embodiments described above.

In a next-generation power network system referred to as a smart grid, a measurement apparatus for measuring the amount of electricity usage is deployed for each user. This measurement apparatus is also referred to as a smart meter (SM). A piece of measurement information measured by the measurement apparatus is transmitted to an information processing apparatus (service providing apparatus) providing an information processing service related to the electricity usage to the user. Based on the received measurement information, the service providing apparatus executes information processing such as a process for billing for the amount of electricity usage, and a process referred to as demand response (DR) including processes such as requesting suppression of electricity usage and paying a reward for it.

There are two routes for such a service providing apparatus to acquire measurement information from a measurement apparatus. Measurement apparatuses are managed by a business entity that transmits and distributes electricity (referred to as a transmitting and distributing business entity). Each of such measurement apparatuses is connected to a management apparatus referred to as a head-end system managed by the transmitting and distributing business entity, via a network. The management apparatus collects the measurement information from the measurement apparatuses, and stores the information in a meter data management system (MDMS). In the field of smart grid, such a route by which the management apparatus collects the measurement information from the measurement apparatuses is referred to as an A route. One of the routes in which the service providing apparatus acquires the measurement information from the measurement apparatuses is a route by which the service providing apparatus acquires the measurement information via the MDMS (a route for acquiring via the A route).

A user can deploy a home gateway (HGW) that is connected to a measurement apparatus, electric devices, a storage battery, and the like, and can manage and control energy such as electricity. In the field of smart grid, a system for managing and controlling energy using an HGW is referred to as a home energy management system (HEMS). An HGW can acquire the amount of electricity usage directly from the measurement apparatus via a user network deployed by the user. In the field of smart grid, such a route by which an HGW collects the measurement information is referred to as a B route. The other route in which the service providing apparatus acquires the measurement information from the measurement apparatus is a route by which the service providing apparatus acquires the measurement information via a communication apparatus (such as a broadband rout connected to the HGW, or a public communication network connected to the HGW (a route for acquiring via the B route).

The A route is implemented as a wireless multi-hopping communication network routed via a plurality of measurement apparatuses, or a mobile phone communication network, for example. The A route may be implemented as a communication network deployed with power line communication (PLC) using concentrators, and a wide area communication network. Such an A route is managed by the transmitting and distributing business entity, and therefore, the A route is highly reliable. The A route, however, traverses across various types of communication channels to which a large number of measurement apparatuses are connected, and therefore, a certain limitation is imposed on the amount of information that can be communicated. Therefore, when service providing apparatus acquires the measurement information via the A route, the amount of information becomes limited.

With the B route, an abundant bandwidth is available, and a larger amount of information can be communicated, compared with the A route. The B route is, however, managed by a user, and traverses across a communication device. Therefore, there are chances for an illegitimate user to modify the communication device, to manipulate the measurement information, and to transmit the manipulated information to the service providing apparatus. Once the measurement information is manipulated, an illegitimate waiver of the payment of an electricity bill, and an illegitimate acquisition of the reward in demand response become possible, and a loss may occur in the business entity.

Therefore, to acquire the measurement information via the B route, it is necessary for a secret key to be shared between the measurement apparatus and the service providing apparatus, and for the measurement apparatus to generate authentication information for the measurement information using the secret key. To allow a secret key to be shared between the measurement apparatus and the service providing apparatus, however, a concealed communication using a bidirectional key sharing protocol needs to be used between the measurement apparatus and the service providing apparatus, and the communication load becomes increased.

The present invention according to the embodiments described above is used in usage scenarios such as that described above, so that the measurement information measured by the measurement apparatus can be transmitted to the service providing apparatus securely and with a simple process.

Furthermore, each of the computer programs executed on the management apparatus 20, the measurement apparatus 33, and the service providing apparatus 50 according to the embodiments is provided by being recorded in a computer-readable recording medium such as a compact disc read-only memory (CD-ROM), a flexible disk, a compact disc recordable (CD-R), or a digital versatile disc (DVD), as a file in a computer-installable or executable format.

Furthermore, these computer programs may be provided stored in a computer that is connected to a network such as the Internet, and by making available for download over the network. Furthermore, these computer programs may be provided or distributed over a network such as the Internet. Furthermore, these computer programs may be provided incorporated in a ROM or the like in advance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A service providing apparatus that is connected to a measurement apparatus via a second network, and that is connected to a management apparatus via the second network, the measurement apparatus comprising:
　a first storage that stores therein a measurement apparatus individual key shared with the management apparatus;
　a first communication device that is connected to the measurement apparatus via a first network;
　a second communication device that is connected to the service providing apparatus via the second network; and
　one or more first processors coupled to the first storage, the first communication device, and the second communication device, wherein the first communication device receives seed information generated using a service providing apparatus identifier stored in and shared between the management apparatus and the service providing apparatus from the management apparatus via the first network, the service providing apparatus identifier uniquely assigned to the service providing apparatus, the first processors generate a user key using the measurement apparatus individual key and the seed information, the first processors acquire measurement information representing a physical quantity of a target of a service provided by the business entity to the user, the first processors generate authentication information authenticating legitimacy of the measurement information using the measurement information and the user key, the second communication device transmits the measurement information and the authentication information to the service providing apparatus via the second network, the service providing apparatus comprises:
　a user information storage that stores therein at least one key;
　a third communication device that is connected to the management apparatus via the second network;
　a fourth communication device that is connected to the measurement apparatus via the second network; and
　one or more second processors coupled to the third communication device and the fourth communication device, the third communication device receives the user key from the management apparatus via the second network, the fourth communication device receives the measurement information and the authentication information from the measurement apparatus via the second network, the second processors validate whether the measurement information received from the measurement apparatus is legitimate, using the user key stored in the user information storage and the authentication information, the third processors execute a process of providing a service to a user for whom the measurement apparatus having transmitted the measurement information is deployed, using the measurement information validated to be legitimate when the user key is received from the management apparatus, the second processors append order information used for identifying a new user key to the received user key and write in the user information storage, at a time of validating, the second processors append usage information to the user key, the usage information indicating that an update of the user key in the measurement apparatus is completed, and at a predetermined timing, the second processors delete, from among one or more user keys stored in the user information storage, one or more user keys for which the update is completed excluding the new user key identified based on the order information.

2. The service providing apparatus according to claim 1, wherein the third processors determine an update failure of the user key in the measurement apparatus using the order information and the usage information.

3. A computer program product having a non-transitory computer-readable medium that stores therein a computer program causing a computer to function as the service providing apparatus according to claim 1.

* * * * *